US012492656B2

(12) United States Patent
Pal et al.

(10) Patent No.: US 12,492,656 B2
(45) Date of Patent: Dec. 9, 2025

(54) DECOMPOSITION CHAMBERS FOR AFTERTREATMENT SYSTEMS

(71) Applicant: Cummins Emission Solutions Inc., Columbus, IN (US)

(72) Inventors: Yash Pal, Una (IN); Sachin Sharma, Pune (IN); Allick Mounir Olive, Columbus, IN (US); Donald Edward Willey, Huddersfield (GB); Sriram Narayanasamy, Greenwood, IN (US); Priyanka Vinod Chare, Pune (IN); Girish Subramanian, Navi-mumbai (IN); Akash A. Pise, Solapur (IN); Shubham Kalyankar, Amravati (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/543,149

(22) Filed: Dec. 18, 2023

(65) Prior Publication Data

US 2024/0200480 A1   Jun. 20, 2024

Related U.S. Application Data

(60) Provisional application No. 63/433,585, filed on Dec. 19, 2022.

(51) Int. Cl.
*F01N 3/20* (2006.01)
*B01D 53/94* (2006.01)
*F01N 3/28* (2006.01)

(52) U.S. Cl.
CPC ....... *F01N 3/2066* (2013.01); *B01D 53/9431* (2013.01); *F01N 3/2892* (2013.01);
(Continued)

(58) Field of Classification Search
CPC .. F01N 3/2066; F01N 3/2892; F01N 2610/02; F01N 2610/1406;
(Continued)

(56) References Cited

U.S. PATENT DOCUMENTS 3,317,001 A   5/1967   Powers et al.
3,348,629 A   10/1967  Cassel
(Continued)

FOREIGN PATENT DOCUMENTS

CN   301522079   4/2011
CN   308618250   5/2024
(Continued)

OTHER PUBLICATIONS 2013-2018 Ram 6.7 Cummins Exhaust System, posted Mar. 28, 2019 [online], [retrieved Jul. 21, 2025]. Retrieved from internet, https:// www.youtube.com/watch?v= EPxW5ebtybc.
(Continued)

*Primary Examiner* — Mark A Laurenzi
*Assistant Examiner* — Kelsey L Stanek
(74) *Attorney, Agent, or Firm* — Foley & Lardner LLP

(57) ABSTRACT

A decomposition chamber for an aftertreatment system includes an outer conduit that has an inner surface, a doser mount coupled to the outer conduit, and an inner conduit disposed within the outer conduit. The inner conduit has an upstream end, a downstream end, and an outer surface that is spaced from the inner surface of the outer conduit. The inner conduit includes an opening aligned with the doser mount and disposed closer to the upstream end than to the downstream end, and a lip extending along a portion of the opening and angled partially outward and partially toward the upstream end.

20 Claims, 24 Drawing Sheets

(52) U.S. Cl.
CPC ...... *B01D 2251/20* (2013.01); *B01D 2258/01* (2013.01); *F01N 2610/02* (2013.01); *F01N 2610/1406* (2013.01); *F01N 2610/1453* (2013.01)

(58) Field of Classification Search
CPC ......... F01N 2610/1453; F01N 2240/20; B01D 53/9431; B01D 2251/20; B01D 2258/01
USPC ....................................................... 422/168
See application file for complete search history.

(56) References Cited

U.S. PATENT DOCUMENTS

| | | | |
|---|---|---|---|
| 3,500,954 A | 3/1970 | Willette | |
| 5,325,665 A | 7/1994 | Kiso et al. | |
| 5,524,739 A | 6/1996 | Baier et al. | |
| 5,605,399 A | 2/1997 | King | |
| 5,726,397 A | 3/1998 | Mukai et al. | |
| 6,182,445 B1 | 2/2001 | Yamazaki et al. | |
| D444,751 S | 7/2001 | Park | |
| 7,814,745 B2 | 10/2010 | Levin et al. | |
| D645,882 S | 9/2011 | Duffek et al. | |
| D702,736 S | 4/2014 | Tomioka et al. | |
| 9,341,097 B2 | 5/2016 | Bays et al. | |
| 9,718,037 B2 | 8/2017 | Harmon et al. | |
| D809,577 S | 2/2018 | Mcdonald et al. | |
| 9,909,421 B2 | 3/2018 | Staskowiak et al. | |
| 10,012,125 B2 | 7/2018 | Yi et al. | |
| D855,090 S | 7/2019 | Mcdonald et al. | |
| 10,450,921 B2 | 10/2019 | Osada et al. | |
| 10,844,764 B2 | 11/2020 | Brandl et al. | |
| 11,136,910 B2 * | 10/2021 | Liu | B01F 25/4521 |
| 2011/0005208 A1 | 1/2011 | Hamill | |
| 2012/0204541 A1 | 8/2012 | Li et al. | |
| 2015/0218996 A1 * | 8/2015 | Brandl | F01N 3/2066 60/295 |
| 2016/0175784 A1 | 6/2016 | Harmon et al. | |
| 2024/0360779 A1 * | 10/2024 | Riddle, II | F01N 3/28 |

FOREIGN PATENT DOCUMENTS

| | | |
|---|---|---|
| CN | 308758674 | 7/2024 |
| CN | 309135625 | 2/2025 |
| GB | 2 595 019 A | 11/2021 |
| KR | 300505022.000 | 9/2008 |
| KR | 301004836.000 | 5/2019 |
| RU | 00117480 | 11/2019 |
| WO | WO-2020/250015 A1 | 12/2020 |

OTHER PUBLICATIONS

Diesel Aftertreatment Tech tip, posted Sep. 30, 2020 [online], [retrieved Jul. 21, 2025]. Retrieved from internet, https://www.youtube.com/watch?v=bfl5Xw1 mxBQ.

Diesel Exhaust Systems, posted Feb. 2008 [online], [retrieved Jul. 21, 2025]. Retrieved from internet, https://dieselnet.com/tech/ diesel_exh_sys.php.

Restriction Requirement in Design U.S. Appl. No. 29/935,369 issued Jul. 23, 2025.

Torchtree 53425 Catalytic Converter for Ranger 2001 2002 2003 2.3L 2.5L 3L 4L, posted Aug. 16, 2023 [online], [retrieved Jul. 21, 2025]. Retrieved from internet, https://www.amazon.com/Torchtree-53425-Catalytic-Converter-2001-2003/dp/BOC FWKPZ?F /ref.

* cited by examiner

DECOMPOSITION CHAMBERS FOR AFTERTREATMENT SYSTEMS

CROSS-REFERENCE TO RELATED APPLICATION

This U.S. patent application claims the benefit of U.S. Provisional Patent Application No. 63/433,585, filed Dec. 19, 2022, which is incorporated herein by reference in its entirety.

TECHNICAL FIELD

The present application relates generally to decomposition chambers for an aftertreatment system of an internal combustion engine.

BACKGROUND

For internal combustion engines, such as diesel engines, nitrogen oxide ($NO_x$) compounds may be emitted in exhaust. It is desirable to reduce $NO_x$ emissions to comply with environmental regulations, for example. To reduce $NO_x$ emissions, a reductant may be dosed into the exhaust by a dosing system and within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

A component of the aftertreatment system may facilitate a chemical reaction between the exhaust and the reductant. Depending on its configuration, the component can cause decreases in performance and efficiency of an internal combustion engine associated with the aftertreatment system. For example, the component may cause an increase in back pressure on the internal combustion engine which can cause decreased efficiency of the internal combustion engine.

SUMMARY

In one embodiment, a decomposition chamber for an aftertreatment system includes an outer conduit that has an inner surface, a doser mount coupled to the outer conduit, and an inner conduit disposed within the outer conduit. The inner conduit has an upstream end, a downstream end, and an outer surface that is spaced from the inner surface of the outer conduit. The inner conduit includes an opening aligned with the doser mount and disposed closer to the upstream end than to the downstream end, and a lip extending along a portion of the opening and angled partially outward and partially toward the upstream end.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
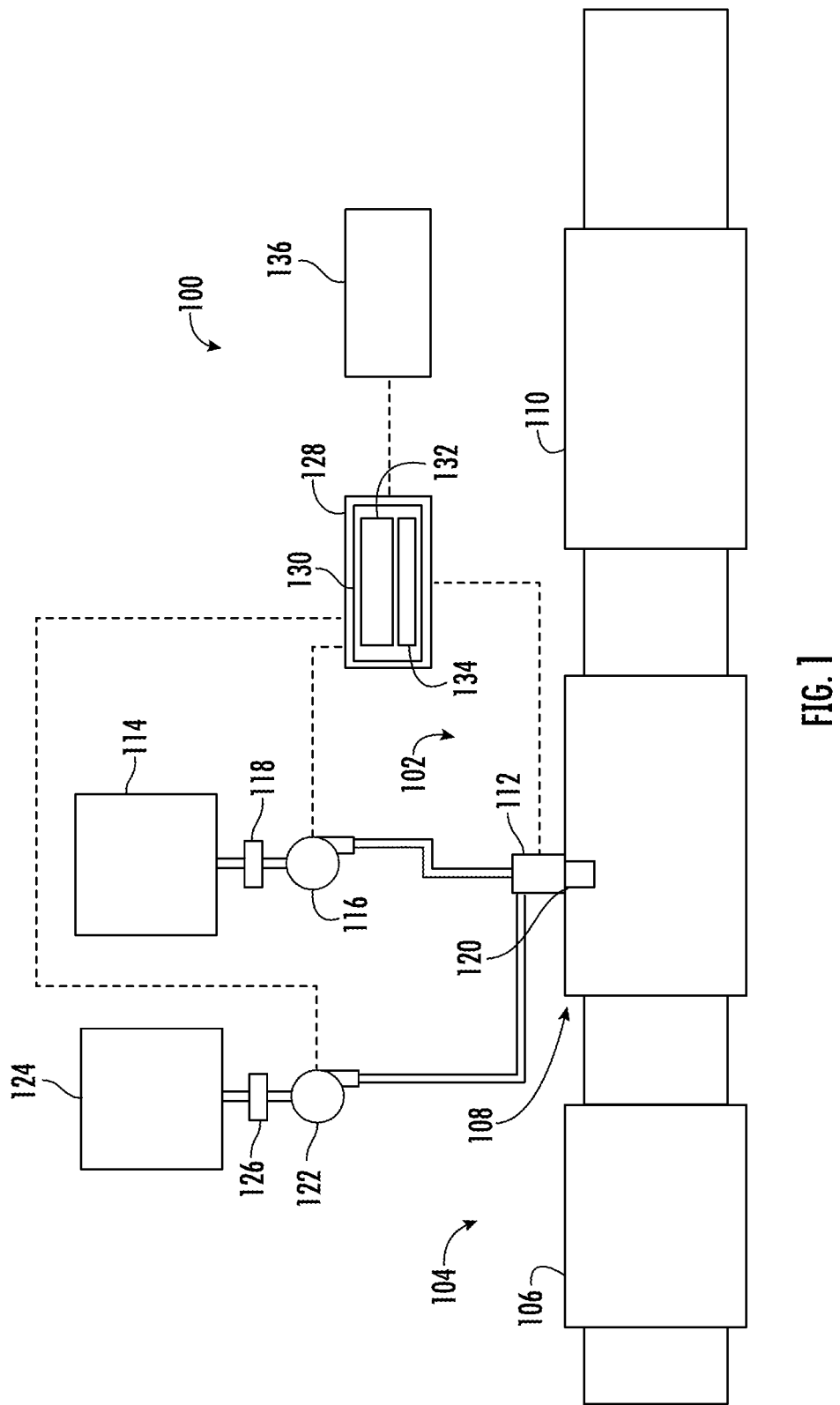
FIG. 1 is a block diagram of an example aftertreatment system.
Figure 2:
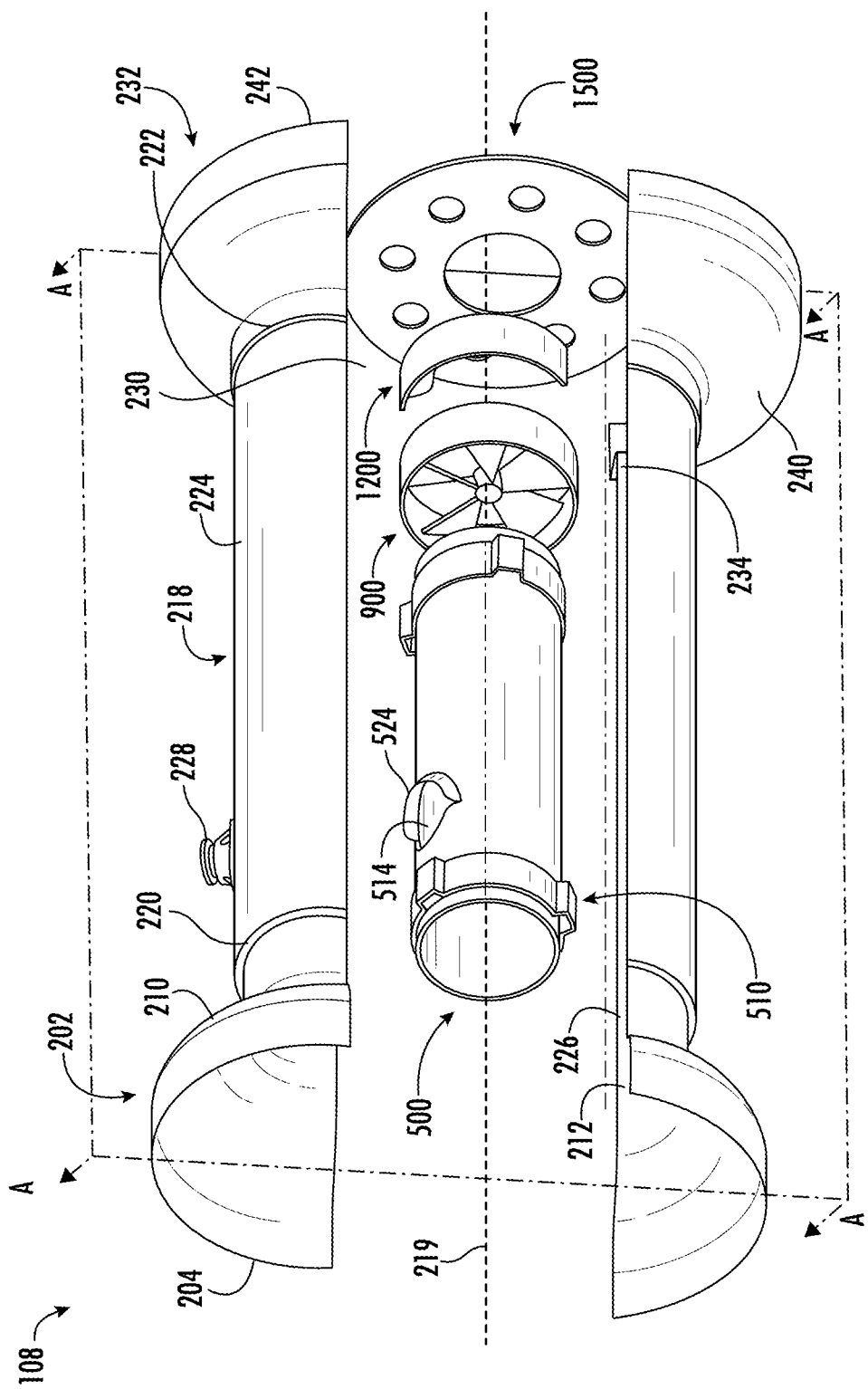
FIG. 2 is an exploded perspective view of an example decomposition chamber.
Figure 3:
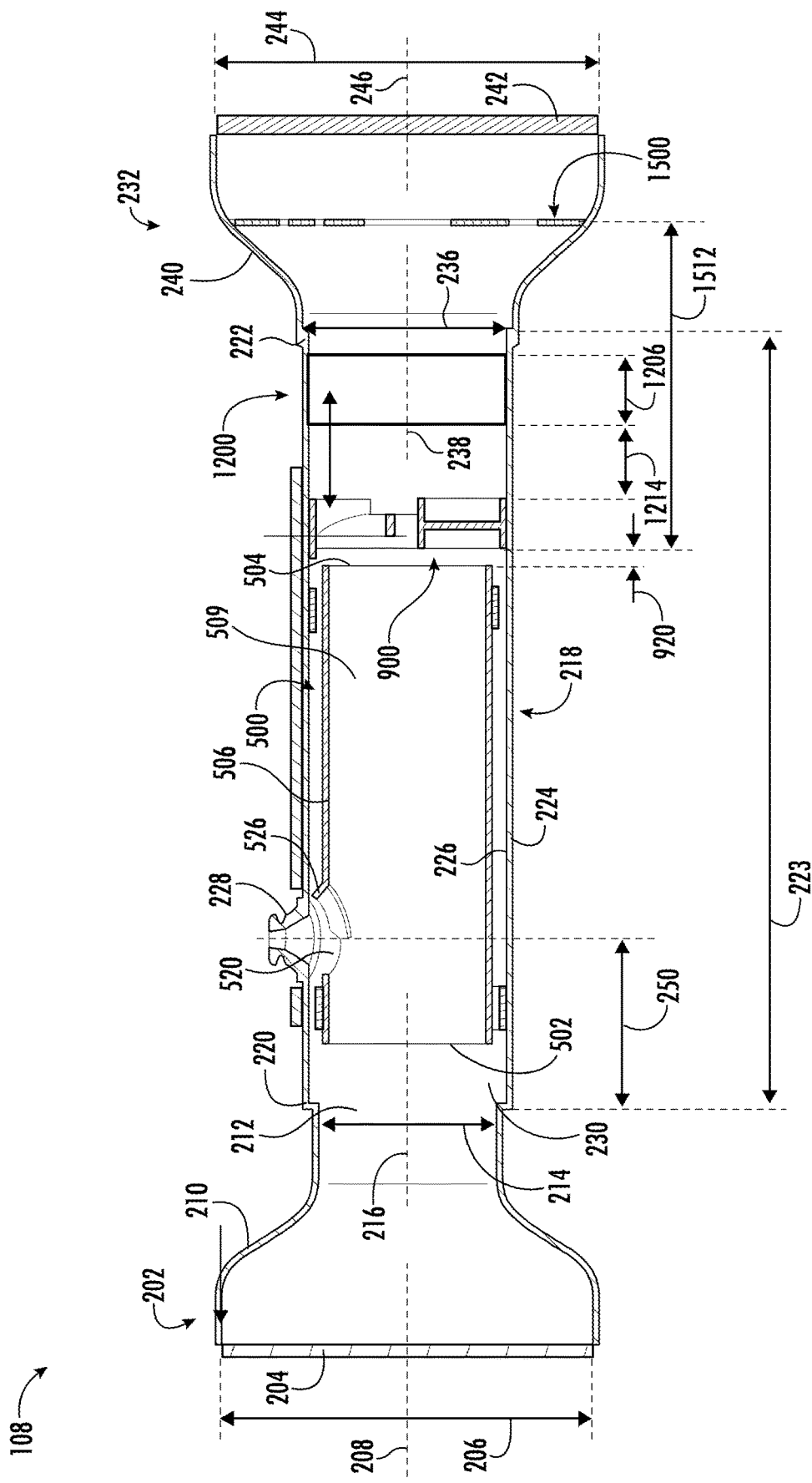
FIG. 3 is a cross-sectional view of the decomposition chamber shown in FIG. 2 taken along plane A-A in FIG. 2.
Figure 4:
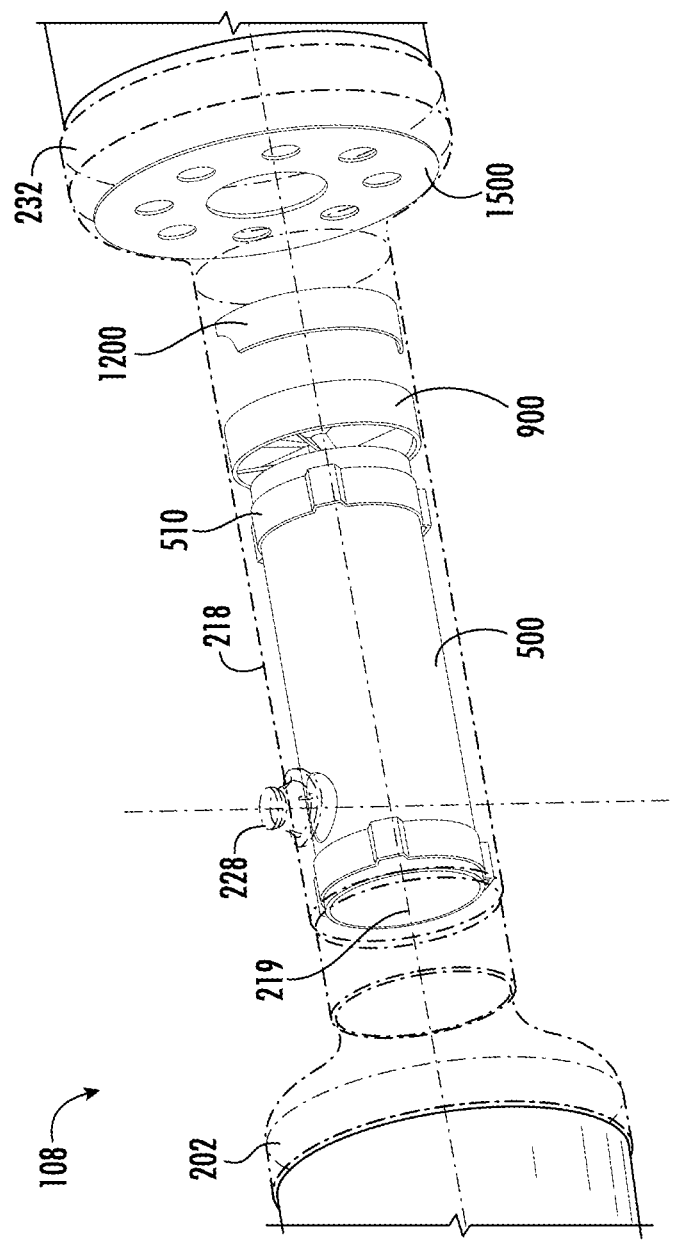
FIG. 4 is a partially-transparent perspective view of the decomposition chamber shown in FIG. 2.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing decomposing chambers in an aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that contains constituents, such as $NO_x$, $N_2$, $CO_2$, and/or $H_2O$. In some applications, an aftertreatment system is utilized to dose the exhaust with a reductant so as to reduce $NO_x$ emissions in the exhaust. These aftertreatment systems may include a decomposition chamber within which the reductant is provided and mixed with the exhaust.

Enhancing mixing of the reductant and exhaust can increase reduction of the $NO_x$ emissions and therefore increase desirability of an aftertreatment system. However, enhancing mixing of the reductant and exhaust can cause increased backpressure on an internal combustion engine having the aftertreatment system, thereby decreasing desirability of the aftertreatment system (e.g., because performance of the internal combustion engine is negatively impacted by the increased backpressure, etc.). Additionally, the reductant may form deposits within the aftertreatment system, such as on internal surfaces of the decomposition chamber, which can also increase the backpressure on the internal combustion engine, and/or because $NO_x$ emissions cannot be desirably reduced.

Some systems may include a decomposition chamber that is centered on an axis that is offset from an axis from which an inlet conduit is centered and offset from an axis on which an outlet conduit is centered. However, such a configuration can make it difficult to uniformly distribute reductant within the exhaust gas without increasing the backpressure within the system.

It is thus desirable to provide a decomposition chamber with various components configured to more uniformly distribute the reductant within the exhaust. A decomposition chamber is provided with an inner conduit disposed in an outer conduit to facilitate thermal management of the exhaust and reductant and to reduce the risk of deposits forming in the system. A combination of a mixer and a baffle disposed in the outer conduit downstream of the inner conduit to improve the distribution of the reductant within the exhaust. The baffle along with a plate disposed within the decomposition chamber facilitates uniform distribution of flow of the exhaust and reductant mixture downstream of the mixer. The decomposition chamber includes a lip disposed on the inner conduit of the decomposition chamber to mitigate the risk of reductant traveling outside of the inner conduit, which may otherwise prevent the reductant from mixing with the exhaust and cause deposits to build up between the inner conduit and the outer conduit, which may increase backpressure in the system.

II. Example Aftertreatment System

FIG. 1 depicts an aftertreatment system 100 having an example reductant delivery system 102 for an exhaust conduit system 104 (e.g., pipe system, tube system, etc.). The aftertreatment system 100 includes the reductant delivery system 102, a particulate filter (e.g., a diesel particulate filter (DPF), etc.) 106, a decomposition chamber 108 (e.g., decomposition reactor, reactor pipe, decomposition tube, reactor tube, etc.), and a selective catalytic reduction (SCR) catalyst member 110.

The particulate filter 106 is configured to remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes an inlet fluidly coupled to (e.g., fluidly configured to communicate with, etc.) the particulate filter 106 to receive the exhaust containing $NO_x$ emissions and an outlet for the exhaust, $NO_x$ emissions, ammonia, and/or reductant to flow to the SCR catalyst member 110.

The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled to (e.g., attached to, fixed to, welded to, integrated with, etc.) a chassis of a vehicle associated with the aftertreatment system 100.

The dosing module 112 includes at least one injector 120. Each injector 120 is configured to dose the reductant into the exhaust (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst member 110. As a result, the reductant is injected by the injector 120 upstream of the SCR catalyst member 110 such that the SCR catalyst member 110 receives a mixture of the reductant and exhaust. The reductant droplets undergo the processes of evaporation, thermolysis, and hydrolysis to form non-$NO_x$ emissions (e.g., gaseous ammonia, etc.) within the decomposition chamber 108 and/or the exhaust conduit system 104.

The SCR catalyst member 110 is configured to assist in the reduction of $NO_x$ emissions by accelerating a $NO_x$ reduction process between the reductant and the $NO_x$ of the exhaust into diatomic nitrogen, water, and/or carbon dioxide. The SCR catalyst member 110 includes an inlet fluidly coupled to the decomposition chamber 108 from which exhaust and reductant are received and an outlet fluidly coupled to an end of the exhaust conduit system 104.

The aftertreatment system 100 may further include an oxidation catalyst (e.g., a diesel oxidation catalyst (DOC)) fluidly coupled to the exhaust conduit system 104 (e.g., downstream of the SCR catalyst member 110 or upstream of the particulate filter 106) to oxidize hydrocarbons and carbon monoxide in the exhaust.

In some implementations, the particulate filter 106 may be positioned downstream of the decomposition chamber 108. For instance, the particulate filter 106 and the SCR catalyst member 110 may be combined into a single unit. In some implementations, the dosing module 112 may instead be positioned downstream of a turbocharger or upstream of a turbocharger.

While the aftertreatment system 100 has been shown and described in the context of use with a diesel internal combustion engine, it is understood that the aftertreatment system 100 may be used with other internal combustion engines, such as gasoline internal combustion engines, hybrid internal combustion engines, propane internal combustion engines, and other similar internal combustion engines.

III. Example Decomposition Chamber

FIGS. 2-4 and 21-22 illustrate the decomposition chamber 108 according to an example embodiment. The decomposition chamber 108 includes an inlet fitting 202 (e.g., connector, section, etc.). FIGS. 2-4, 17-18, and 21-22 illustrate the inlet fitting 202 according to an example embodiment. The inlet fitting 202 is configured to receive exhaust and guide the exhaust into the decomposition chamber 108. The inlet fitting 202 includes an upstream inlet opening 204. The upstream inlet opening 204 has an upstream inlet opening diameter 206. The upstream inlet opening diameter 206 may be between approximately (e.g., within 5% of, etc.) 220 mm and 235 mm (e.g., approximately 228.6 mm, etc.). The upstream inlet opening 204 defines an upstream inlet axis 208. The upstream inlet axis 208 extends through a center of the upstream inlet opening 204.

The inlet fitting 202 includes an inlet body 210 that extends from the upstream inlet opening 204. The inlet fitting 202 includes a downstream inlet opening 212. The inlet body 210 extends between the upstream inlet opening 204 and the downstream inlet opening 212. The downstream inlet opening 212 has a downstream inlet opening diameter 214. The downstream inlet opening diameter 214 is less than the upstream inlet opening diameter 206. For example, the upstream inlet opening 204 may have a first area and the downstream inlet opening 212 may have a second area. The first area may be greater than the second area. The downstream inlet opening 212 is centered on a downstream inlet axis 216. The downstream inlet axis 216 extends through a center of the downstream inlet opening 212. The downstream inlet axis 216 may be aligned with or offset from the upstream inlet axis 208. For example, the inlet fitting 202 may be asymmetrical such that a center of the upstream inlet opening 204 does not align with a center of the downstream inlet opening 212, and therefore the upstream inlet axis 208 does not align with the downstream inlet axis 216. In various embodiments, the inlet fitting 202 is configured such that the upstream inlet axis 208 is parallel to the downstream inlet axis 216. For example, the inlet fitting 202 may be configured such that the upstream inlet axis 208 is parallel to the downstream inlet axis 216 and offset from the downstream inlet axis 216.

The decomposition chamber 108 includes an outer conduit 218. FIGS. 2-4, 7, and 21 illustrate the outer conduit 218 according to an example embodiment. The outer conduit 218 is centered on an outer conduit axis 219. The outer conduit axis 219 extends through a center of the outer conduit 218. The outer conduit 218 has an upstream outer conduit end 220 and a downstream outer conduit end 222. The upstream outer conduit end 220 and the downstream outer conduit end 222 are centered on the outer conduit axis 219. The outer conduit 218 has an outer conduit length 223 that extends between the upstream outer conduit end 220 and the downstream outer conduit end 222. The outer conduit length 223 may be between approximately 460 mm and 500 mm. The inlet fitting 202 couples to the upstream outer conduit end 220. The outer conduit 218 has an external surface 224 and an internal surface 226. The internal surface 226 defines an outer conduit cavity 230. As described in more detail herein, various components of the decomposition chamber 108 may be disposed within the outer conduit cavity 230. The decomposition chamber 108 includes a doser mount 228. The doser mount 228 facilitates positioning of a dosing module 112 such that the dosing module 112 can provide reductant to the exhaust flowing through the decomposition chamber 108. The doser mount 228 is coupled to the outer conduit 218. For example, the doser mount 228 is coupled to the external surface 224 and extends away from the outer conduit 218.

The doser mount 228 is positioned a distance away from the upstream outer conduit end 220, shown as mount distance 250. The mount distance 250 is measured from the upstream outer conduit end 220 to a center of the doser mount 228. The mount distance 250 may be between approximately 90 mm and 110 mm (e.g., approximately 102 mm, etc.). In some embodiments, the doser mount 228 is disposed closer to the upstream outer conduit end 220 than the downstream outer conduit end 222.

The decomposition chamber 108 includes an outlet fitting 232. FIGS. 2-4 and 19-22 illustrate the outlet fitting 232 according to an example embodiment. The outlet fitting 232 is configured to receive the exhaust from within the outer conduit 218 and guide the exhaust to a downstream component of the aftertreatment system 100 (e.g., the SCR catalyst member 110). The outlet fitting 232 couples with the outer conduit 218. The outlet fitting 232 includes a first outlet opening, shown as upstream outlet opening 234. The upstream outlet opening 234 has an upstream outlet opening diameter 236. The upstream outlet opening 234 defines an upstream outlet axis 238. The upstream outlet axis 238 extends through a center of the upstream outlet opening 234.

The outlet fitting 232 includes an outlet body 240 that extends from the upstream outlet opening 234. The outlet fitting 232 includes a second outlet opening, shown as downstream outlet opening 242. The outlet body 240 extends between the upstream outlet opening 234 and the downstream outlet opening 242. The downstream outlet opening 242 has a downstream outlet opening diameter 244. The downstream outlet opening diameter 244 may be between approximately 235 mm and 250 mm (e.g., approximately 241.3 mm, etc.). The downstream outlet opening diameter 244 is greater than the upstream outlet opening diameter 236. For example, the upstream outlet opening 234 may have a first area and the downstream outlet opening 242 may have a second area. The first area may be smaller than the second area. The downstream outlet opening 242 defines a downstream outlet axis 246. The downstream outlet axis 246 extends through a center of the downstream outlet opening 242. The downstream outlet axis 246 may be aligned with or offset from the upstream outlet axis 238. For example, the outlet fitting 232 may be asymmetrical such that a center of the upstream outlet opening 234 does not align with a center of the downstream outlet opening 242, and therefore the upstream outlet axis 238 does not align with the downstream outlet axis 246. In various embodiments, the outlet fitting 232 is configured such that the upstream outlet axis 238 is parallel to the downstream outlet axis 246. For example, the outlet fitting 232 may be configured such that the upstream outlet axis 238 is parallel to the downstream outlet axis 246 and offset from the downstream outlet axis 246.

Figure 22:
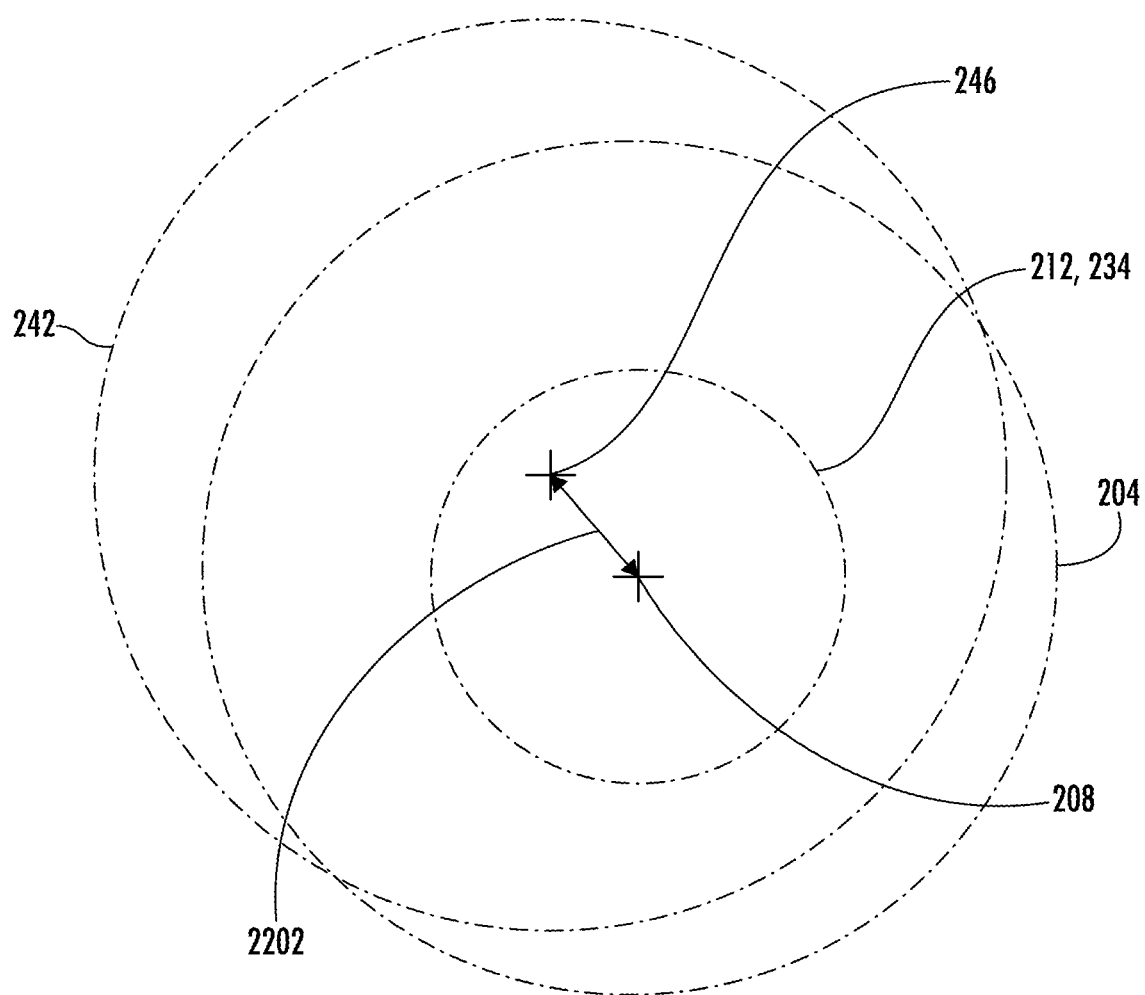
FIG. 22 is a partially-transparent front view of the portion of the decomposition chamber shown in FIG. 21.

The upstream inlet opening 204 may be offset from the downstream outlet opening 242. For example, as shown in FIG. 22, the upstream inlet axis 208 is offset a distance from the downstream outlet axis 246, shown as axis offset distance 2202. The axis offset distance 2202 may be between 35 mm and 45 mm (e.g., approximately 39.75 mm). In some embodiments, the upstream inlet axis 208 and the downstream outlet axis 246 are offset from the outer conduit axis 219.

The decomposition chamber 108 also includes an inner conduit 500. FIGS. 2-8 illustrate the inner conduit 500 according to an example embodiment. The inner conduit 500 is configured to maintain thermal properties of the decomposition chamber 108 (e.g., temperature within the decomposition chamber 108) at desired values and reduce the amount of deposit buildup within the decomposition chamber 108. The inner conduit 500 is disposed within the outer conduit 218. For example, the inner conduit 500 is disposed in the outer conduit cavity 230. The inner conduit 500 may be centered on the outer conduit axis 219. The inner conduit 500 has an upstream inner conduit end 502, a downstream inner conduit end 504, and an outer surface 506 that extends between the upstream inner conduit end 502 and the downstream inner conduit end 504. The inner conduit 500 has an inner conduit length 507. The inner conduit length 507 may range between 290 mm and 310 mm (e.g., approximately 293.8 mm, etc.). The inner conduit 500 has an inner conduit outer diameter 508. The inner conduit outer diameter 508 may be between 90 mm and 110 mm (e.g., approximately 102 mm, etc.). The inner conduit 500 defines an inner conduit cavity 509. The inner conduit cavity 509 provides a path for the exhaust to flow and a location for the reductant to mix with the exhaust. The outer surface 506 separates the inner conduit cavity 509 from the outer conduit cavity 230.

Figure 5:
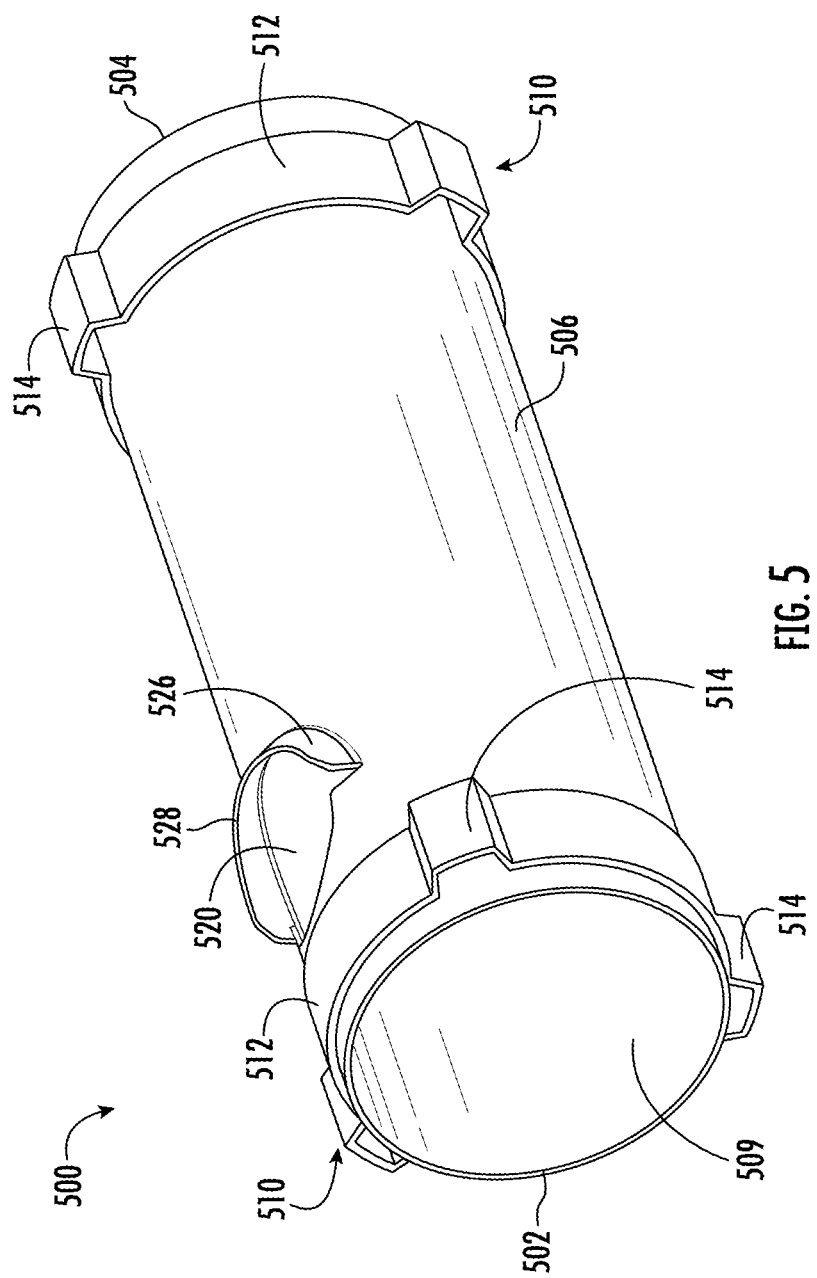
FIG. 5 is a perspective view of a portion of the decomposition chamber shown in FIG. 2.
Figure 8:
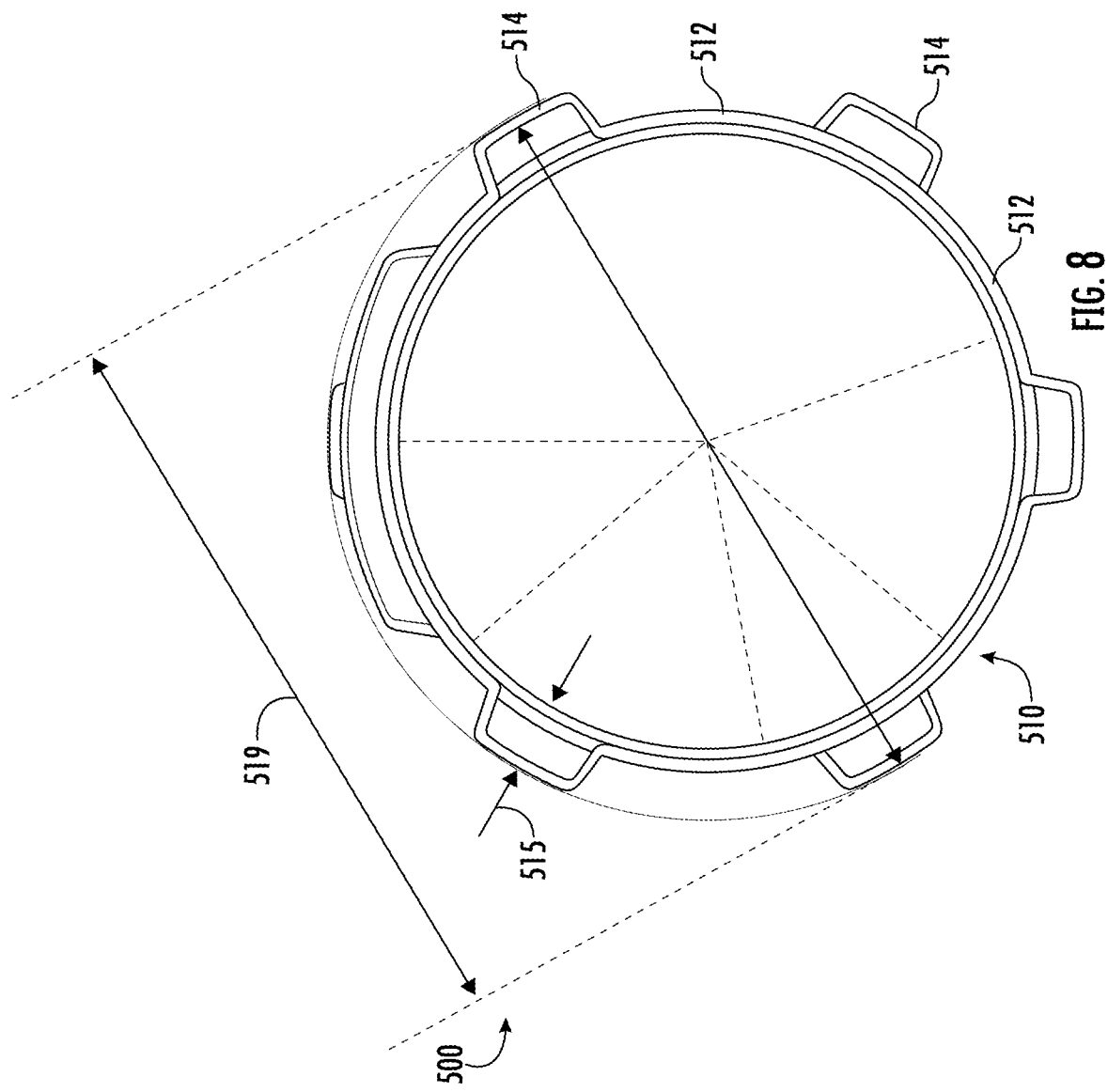
FIG. 8 is a front view of the portion of the decomposition chamber shown in FIG. 5.
Figure 9:
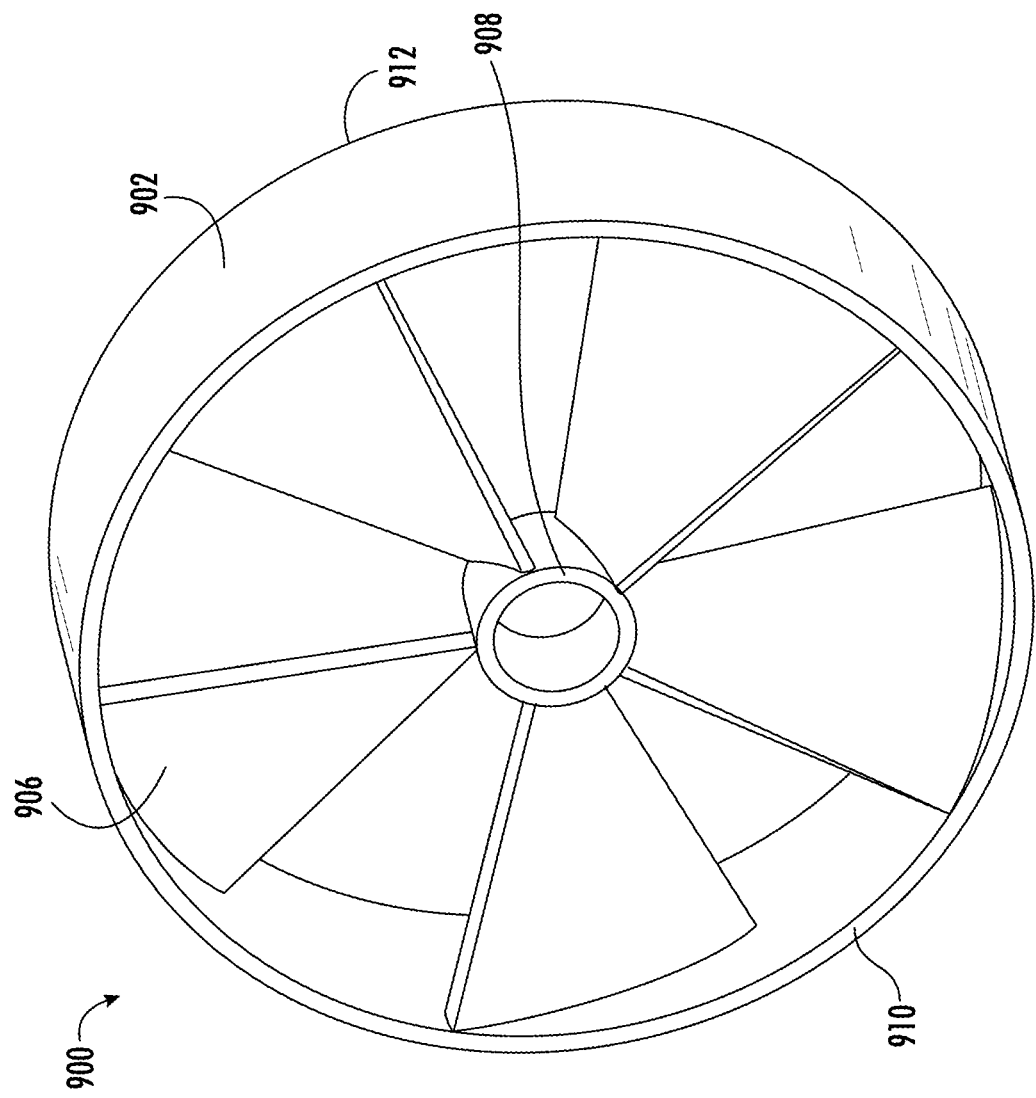
FIG. 9 is a perspective view of another portion of the decomposition chamber shown in FIG. 2.
Figure 10:
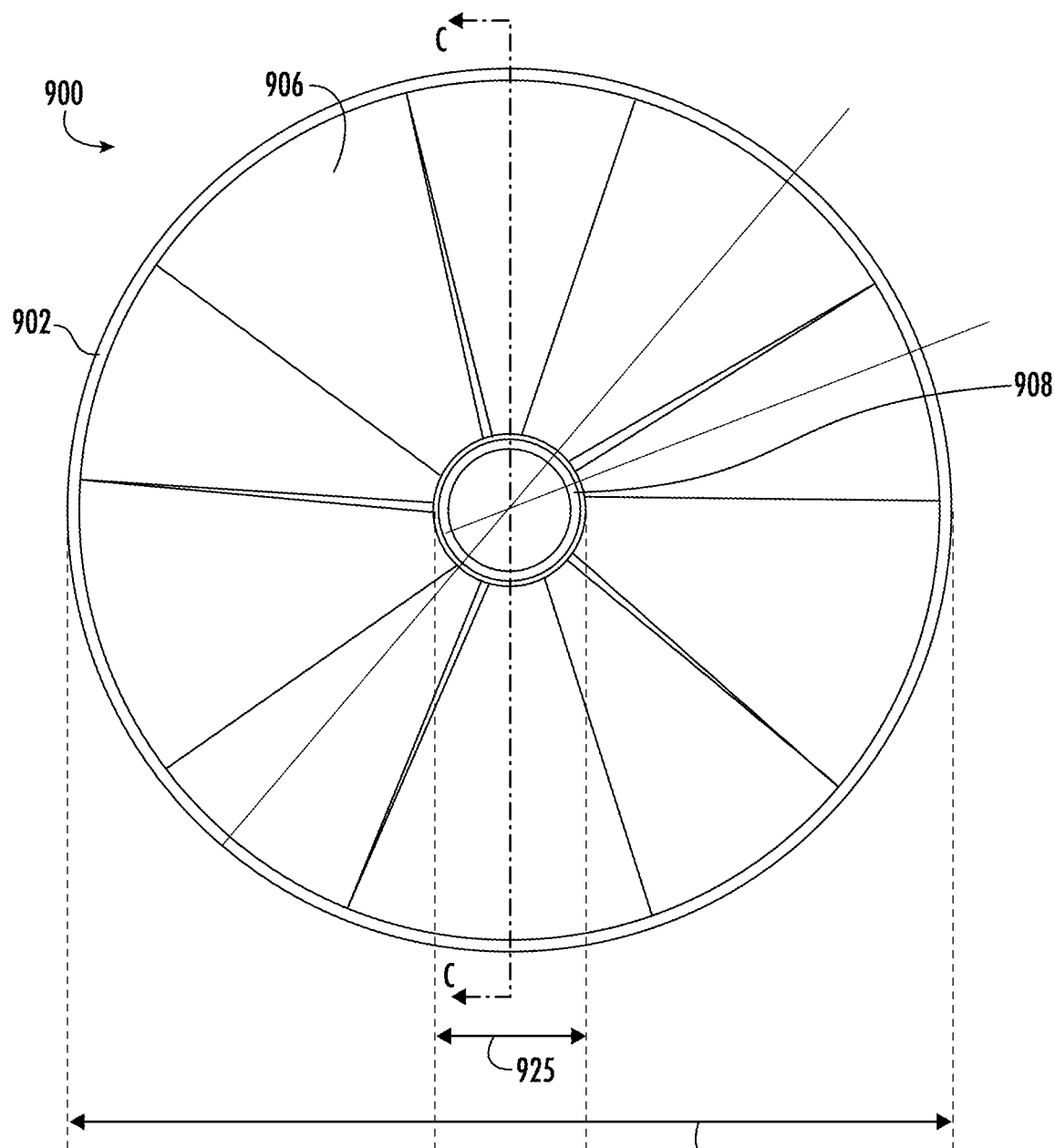
FIG. 10 is a front view of another portion of the decomposition chamber shown in FIG. 2.
Figure 11:
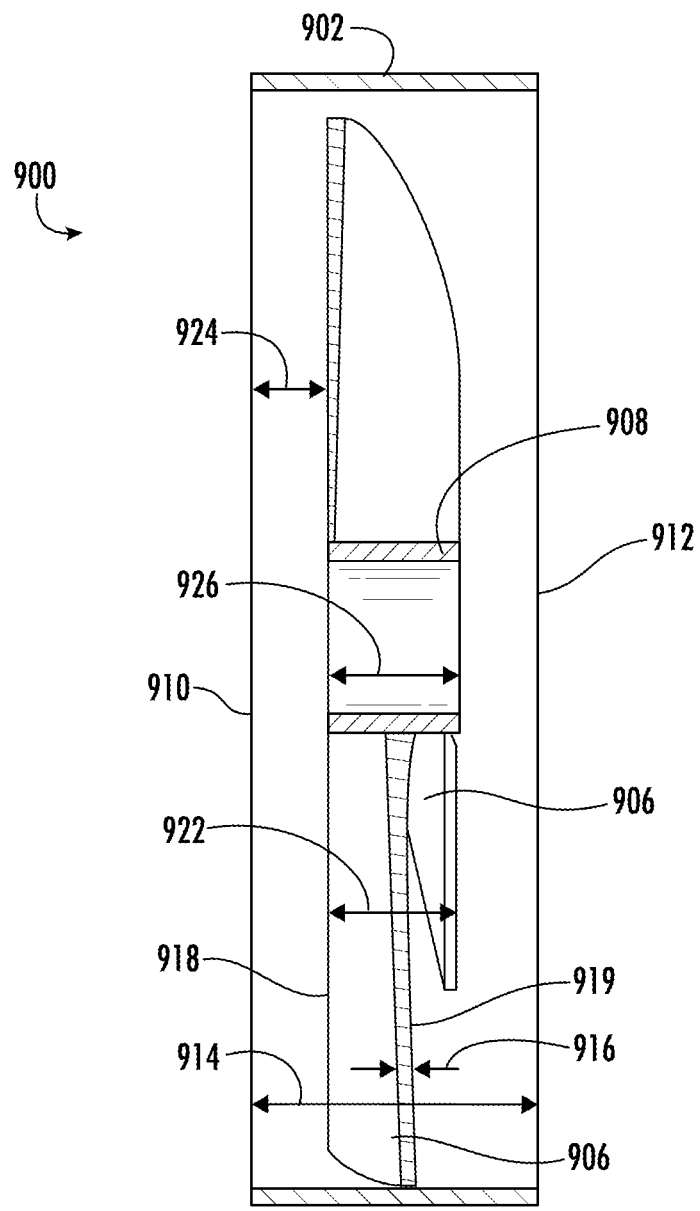
FIG. 11 is a cross-sectional view of the portion of the decomposition chamber shown in FIG. 10 taken along plane C-C in FIG. 10.
Figure 12:
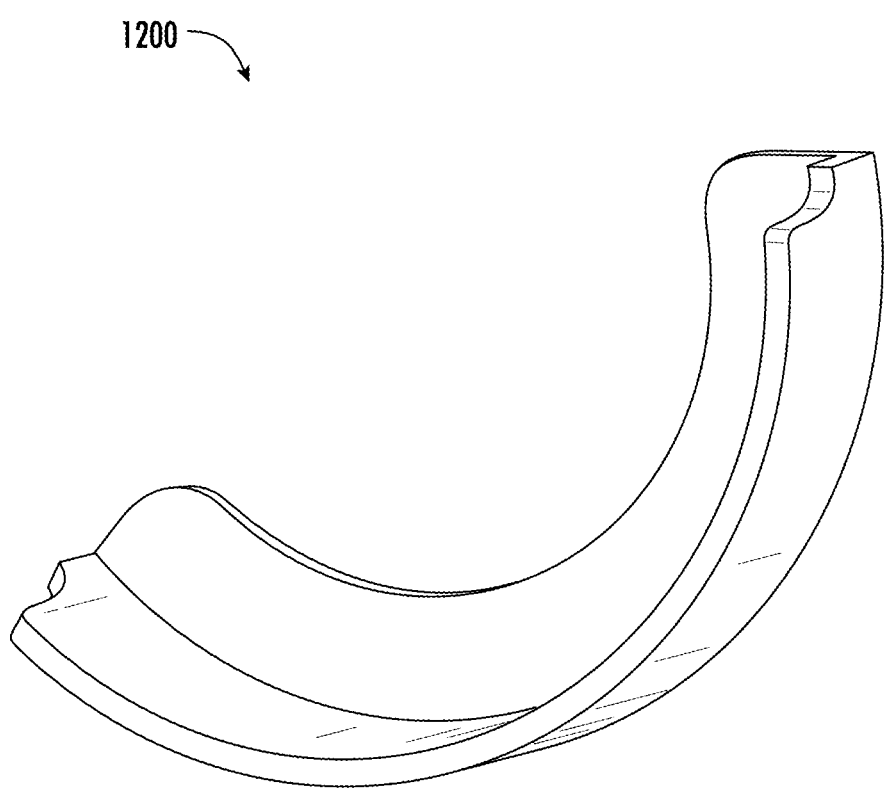
FIG. 12 is a perspective view of another portion of the decomposition chamber shown in FIG. 2.

The decomposition chamber 108 also includes at least one spacer 510. The spacer 510 is configured to position the inner conduit 500 within the outer conduit 218. The spacer 510 has a body 512 and at least one flange 514. The spacer 510 is disposed around the inner conduit 500. The body 512 interfaces with or couples to the outer surface 506 of the inner conduit 500. The flange 514 may be a portion of the spacer 510 that extends away from the inner conduit 500 toward the internal surface 226 of the outer conduit 218 and is configured to interface with or couple to the internal surface 226. The spacer 510 may have a plurality of flanges 514. The plurality of flanges may be positioned equidistant from each other around inner conduit 500. For example, as shown in FIGS. 5 and 8, the spacer 510 may have three flanges 514. Each flange 514 is spaced approximately 120 degrees (±10%) away from each other.

The spacer 510 is configured to position the inner conduit 500 such that the outer surface 506 is spaced apart from the internal surface 226 of the outer conduit 218. For example, the flange 514 may have a flange length 515. The spacer 510 disposed around the inner conduit 500 positions the inner conduit 500 such that the outer surface 506 is disposed away from the internal surface 226 a distance based on the flange length 515. Each flange 514 may have the same flange length 515 such that the inner conduit 500 is positioned centrally on the outer conduit axis 219. As such, the outer surface 506 and the internal surface 226 define a conduit gap 516. The conduit gap 516 may be between 7 mm and 13 mm (e.g., approximately 9.7 mm, etc.).

The decomposition chamber 108 may include a plurality of spacers 510. For example, a first spacer 510 may be disposed proximate the upstream inner conduit end 502 and a second spacer 510 may be disposed proximate the downstream inner conduit end 504. The first spacer 510 may be disposed a first distance away from the upstream inner conduit end 502, shown as upstream spacer distance 517. The second spacer 510 may be disposed a second distance away from the downstream inner conduit end 504, shown as downstream spacer distance 518. The upstream spacer distance 517 may be less than the downstream spacer distance 518. For example, the upstream spacer distance 517 may be between 7 mm and 11 mm (e.g., approximately 9 mm, etc.) and the downstream spacer distance 518 may be between 13 mm and 17 mm (e.g., approximately 15 mm, etc.).

The spacers 510 may be oriented such that a flange 514 of the first spacer 510 is offset from a flange 514 of the second spacer 510. For example, as shown in FIGS. 5 and 8, the first spacer 510 may have three flanges 514 disposed at approximately 60 degrees, 180 degrees, and 300 degrees around the inner conduit 500 and the second spacer 510 may have three flanges 514 disposed at approximately 0 degrees, 120 degrees, and 240 degrees around the inner conduit 500. Such a configuration may reduce the amount of backpressure provided by the spacers 510. For example, forcing exhaust to flow through a first flange and then a second flange that is aligned with the first flange would increase the backpressure in the decomposition chamber 108. Rotating the second spacer 510 such that the flanges 514 of the first spacer 510 do not align with the flanges 514 of the second spacer 510 prevents the exhaust from flowing through two separate flanges 514 and therefore reduces the backpressure provided by the spacers 510.

The inner conduit 500 may have a flange diameter 519 measured between a first flange 514 of a first spacer 510 and a second flange 514 of a second spacer 510 disposed on an opposite side of the inner conduit 500 than the first flange 514. The flange diameter 519 may be between 115 mm and 125 mm (e.g., approximately 121.4 mm, etc.). The spacers 510 may be arranged such that the spacer 510 disposed proximate to the downstream inner conduit end 504 does not have a flange 514 disposed straight below the inner conduit 500 at the 180 degree position. This may reduce deposit buildup under the inner conduit 500 and therefore prevent or reduce an increase in backpressure.

Figure 6:
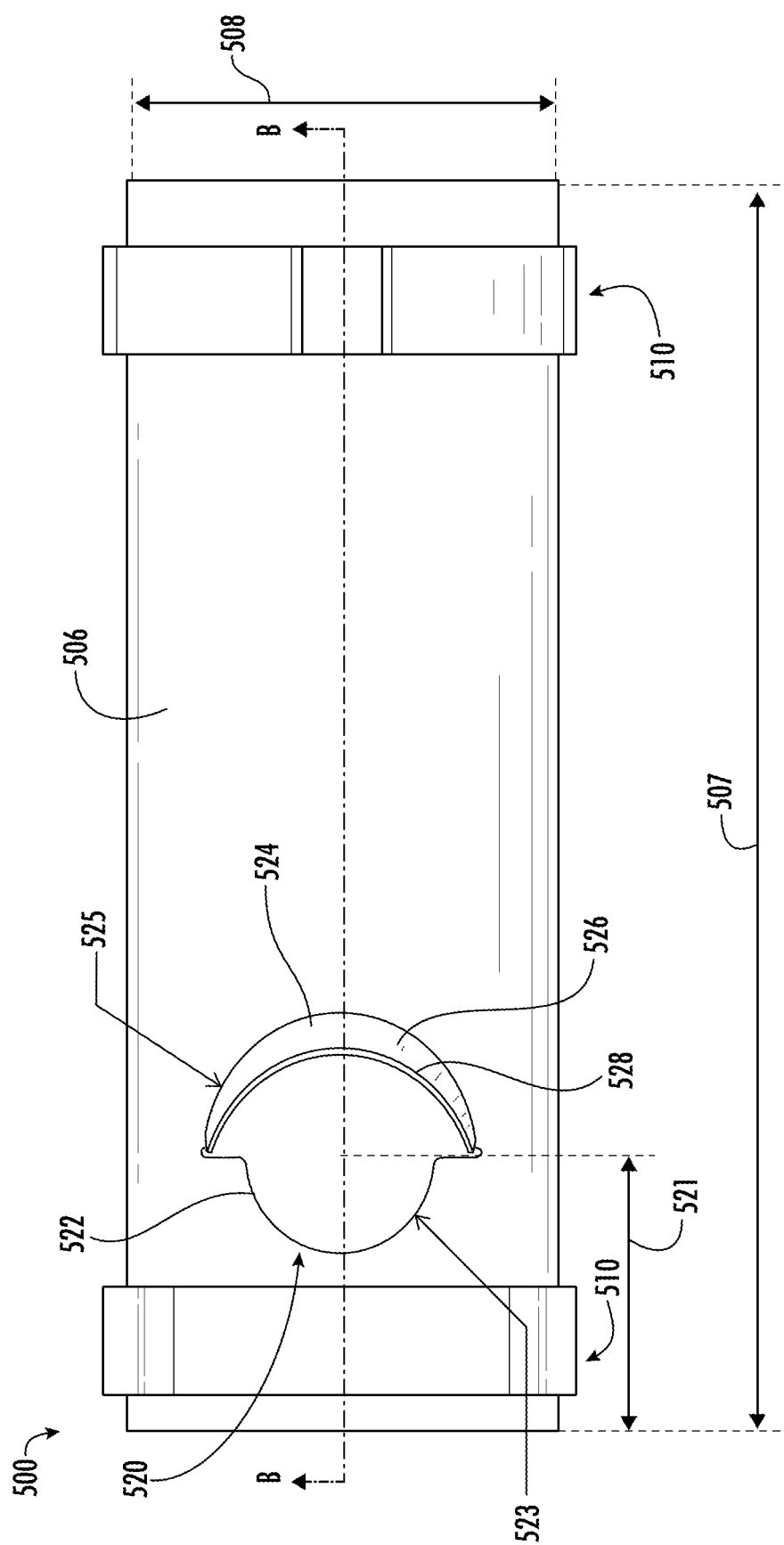
FIG. 6 is a top view of the portion of the decomposition chamber shown in FIG. 5.

The inner conduit 500 includes at least one opening, shown as doser opening 520. The doser opening 520 is configured to provide a path for reductant from a dosing module 112 to enter the decomposition chamber 108 and mix with the exhaust within the inner conduit 500. The doser opening 520 extends through the inner conduit 500 and exposes the inner conduit cavity 509. The doser opening 520 is aligned with the doser mount 228 of the outer conduit 218. The doser opening 520 may be disposed closer to the upstream inner conduit end 502 than the downstream inner conduit end 504. For example, a center of the doser opening 520 is positioned a distance away from the upstream inner conduit end 502, shown as opening distance 521. The opening distance 521 may be between 60 mm and 70 mm (e.g., approximately 64.3 mm, etc.). As shown in FIG. 6, the doser opening 520 includes a first edge, shown as upstream edge 522. The upstream edge 522 is defined by a first radius of curvature 523. The doser opening 520 includes a second edge, shown as downstream edge 524, disposed downstream of the upstream edge 522. The downstream edge 524 is defined by a second radius of curvature 525. The second radius of curvature 525 is greater than the first radius of curvature 523. For example, the first radius of curvature 523 may be between 15 mm and 30 mm (e.g., approximately 22.7 mm, etc.) and the second radius of curvature 525 may be between 25 mm and 40 mm (e.g., approximately 32.1 mm, etc.). The upstream edge 522 extends around approximately a first half of the doser opening 520 (e.g., 180 degrees) and the downstream edge 524 extends around approximately a second half of the doser opening 520.

The inner conduit 500 includes a lip 526. The lip 526 is configured to direct the reductant provided by the dosing module 112 into the inner conduit 500 and prevent the reductant from flowing outside of the inner conduit 500 and traveling downstream between the outer surface 506 of the inner conduit 500 and the internal surface 226 of the outer conduit 218 (e.g., through the conduit gap 516). For example, the lip 526 may cause at least 70% (e.g., approximately 77%) of the reductant to flow through the inner conduit 500 such that less than 30% of the reductant flows through the conduit gap 516. Keeping the reductant inside the inner conduit 500 may reduce deposit buildup since less reductant will be outside of the inner conduit 500 and having to navigate around the spacers 510 and flanges 514 disposed in the conduit gap 516. Less deposit buildup may reduce the increase in backpressure within the decomposition chamber 108.

Figure 7:
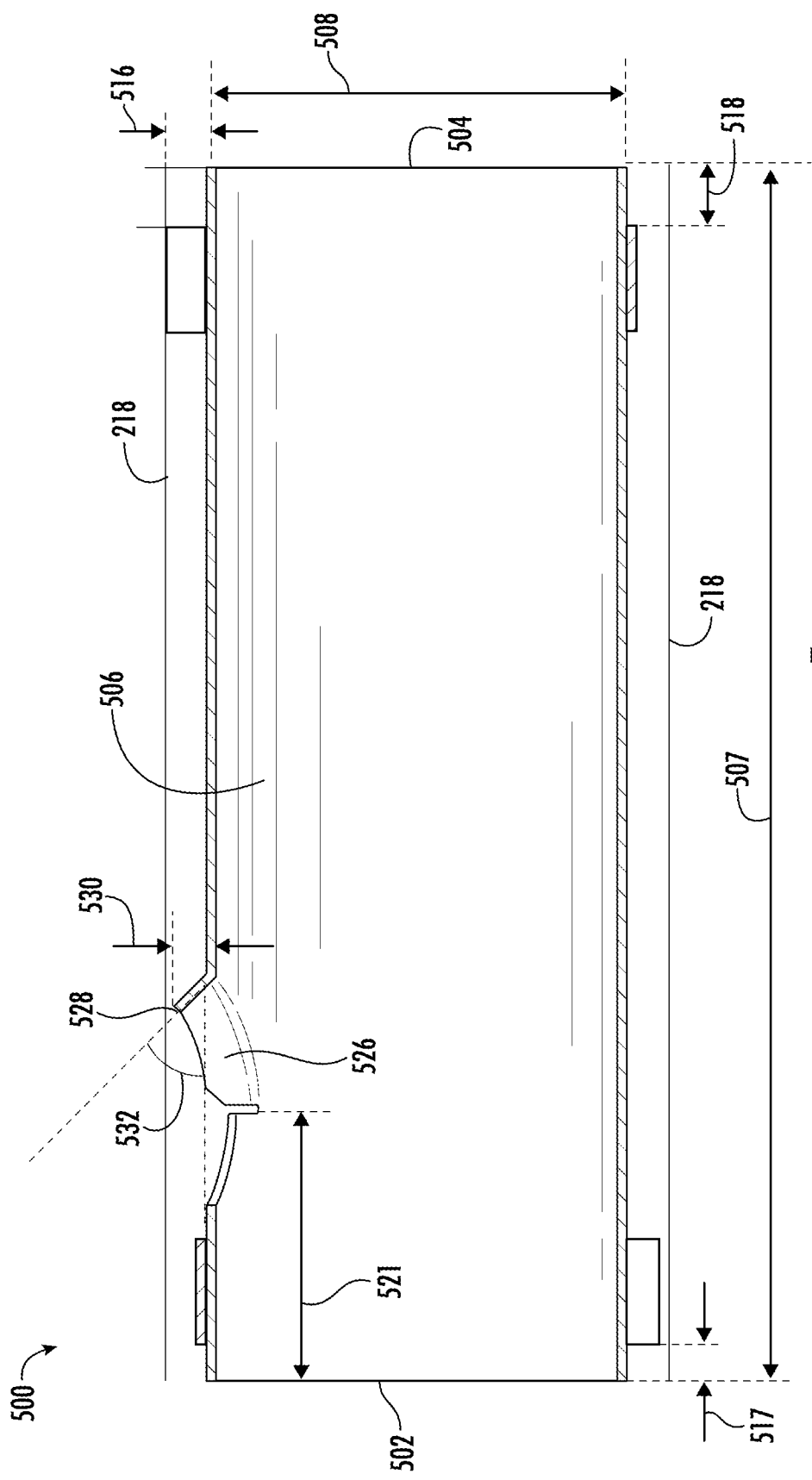
FIG. 7 is a cross-sectional view of the portion of the decomposition chamber shown in FIG. 5 taken along plane B-B in FIG. 6.

The lip 526 extends along a portion of the doser opening 520. For example, the lip 526 extends along at least a portion of the downstream edge 524 of the doser opening 520. The lip 526 is angled at least partially outward. For example, the lip 526 extends away from the outer surface 506 of the inner conduit 500 toward the internal surface 226 of the outer conduit 218. The lip 526 has a lip edge 528 and a lip height 530. The lip height 530 is the distance the lip edge 528 is away from the outer surface 506 of the inner conduit 500. The lip height 530 may be, for example, between 6 mm-10 mm (e.g., 7.86 mm). The lip 526 extends at least partially toward the upstream inner conduit end 502. For example, as shown in FIG. 7, the lip 526 extends at an angle 532 toward the upstream inner conduit end 502 relative to the outer surface 506 of the inner conduit 500. For example, the lip 526 may extend at a 45 degree angle from the outer surface 506.

The decomposition chamber 108 also includes a mixer 900 (e.g., mixing assembly, etc.) that is disposed within the outer conduit 218 in various embodiments. FIGS. 2-4, 9-11, and 13-14 illustrate the mixer 900 according to an example embodiment. In some embodiments, the mixer 900 may include a mixer wall 902. The mixer wall 902 may be coupled to the outer conduit 218. The mixer 900 has an outer diameter, shown as mixer diameter 904. The mixer diameter 904 may be between 115 mm and 130 mm (e.g., approximately 122 mm, etc.). The mixer 900 also includes a plurality of vanes 906 (e.g., blades, etc.) and a hub 908. Each of the vanes 906 is coupled to the mixer wall 902 and the hub 908. In some embodiments, the mixer 900 does not include the mixer wall 902. In these embodiments, the vanes 906 may be coupled directly to the outer conduit 218. After the exhaust gas flows through the inner conduit 500, the exhaust gas flows into the mixer 900 and between adjacent vanes 906. By flowing between adjacent vanes 906, the exhaust gas is caused to rotate downstream of the mixer 900. This rotation facilitates mixing of the exhaust gas and reductant.

The mixer wall 902 extends between a mixer inlet 910 and a mixer outlet 912. The mixer 900 has a mixer length 914. The mixer length 914 is the distance between the mixer inlet 910 and the mixer outlet 912. The mixer length 914 may be between 25 mm and 35 mm (e.g., approximately 30.6 mm, etc.). The vanes 906 and the hub 908 are disposed between the mixer inlet 910 and the mixer outlet 912. The hub 908 may have a hub thickness 926. The hub thickness 926 may be between 10 mm and 20 mm (e.g., approximately 13.7 mm, etc.).

The mixer 900 may include a plurality of vanes 906. For example, the mixer 900 may include five vanes 906 equally spaced within the mixer wall 902. The hub 908 may be coupled to each of the plurality of vanes 906. Each vane 906 may have a vane thickness 916. The vane thickness 916 may be between 1 mm and 3 mm (e.g., approximately 1.5 mm, etc.). Each vane 906 has an upstream vane edge 918 and a downstream vane edge 919. Each vane 906 may have a vane length 922 measured from the upstream vane edge 918 to the downstream vane edge 919. The vane length 922 may be between 8 mm and 15 mm (e.g., approximately 12.3 mm, etc.). The upstream vane edges 918 of the vanes 906 may be a distance away from mixer inlet 910, shown as vane distance 924. The vane distance 924 may be between 5 mm and 15 mm (e.g., approximately 9.8 mm, etc.).

The mixer 900 is disposed downstream of the inner conduit 500. For example, the mixer 900 may be disposed a mixer distance 920 downstream of the downstream inner conduit end 504. The mixer distance 920 may be measured between the downstream inner conduit end 504 and the mixer inlet 910. The mixer distance 920 may be between 15 mm and 25 mm (e.g., approximately 18 mm, etc.). The mixer 900 is disposed at the mixer distance 920 to facilitate proper mixing of the exhaust gas with the reductant while also reducing deposit formation prior to the mixer 900. The mixer distance 920 may be based on the mixer diameter 904. For example, the mixer distance 920 may be between 10-20% of the mixer diameter 904. As such, the mixer distance 920 may change as the mixer diameter 904 changes (e.g., the size of outer conduit 218 changes).

In some embodiments, the hub 908 is configured to facilitate flow of the exhaust gas through the hub 908 (e.g., such that a portion of the exhaust gas can flow through the hub 908 without flowing between adjacent vanes 906, etc.). In such embodiments, the exhaust gas flowing through the hub 908 may aid in propelling the exhaust gas downstream of the mixer 900 toward the outlet fitting 232, thereby reducing a backpressure of the decomposition chamber 108. The hub 908 may have a hub diameter 925. The hub diameter 925 may be an outer diameter of the hub 908. The hub diameter 925 may be between 15 mm and 25 mm (e.g., approximately 20 mm, etc.).

The decomposition chamber 108 may also include a baffle 1200. FIGS. 2-4 and 12-14 illustrate the baffle 1200 according to an example embodiment. The baffle 1200 is configured to make the flow distribution of the exhaust and reductant mixture more uniform downstream of the mixer 900. For example, the location of the baffle 1200 can be based on a location within the outer conduit 218 where particulates tend flow toward to disrupt the momentum and trajectory of those particles and create a more uniform flow.

The baffle 1200 may have a first portion, shown as baffle wall 1202. The baffle wall 1202 may be coupled to the internal surface of the outer conduit 218. The baffle wall 1202 may have a shape of a portion of a cylinder. For example, the baffle wall 1202 may extend a distance along the outer conduit length 223 of the outer conduit 218 and extend an angle around an outer conduit axis 219 of the outer conduit 218 (e.g., the baffle wall 1202 has a semi-circular shape). The distance the baffle wall 1202 extends along the outer conduit length 223 may be the baffle length 1206. The baffle length 1206 may be between 20 mm and 30 mm (e.g., approximately 23 mm, etc.). The angle that the baffle 1200 extends around the outer conduit axis 219 is the baffle angle coverage 1208. The baffle angle coverage 1208 may be between 160 degrees and 180 degrees (e.g., approximately 170.5 degrees, etc.).

The baffle 1200 may have a second portion, shown as baffle flange 1210. The baffle flange 1210 may have a shape of a portion of an annular object (e.g., an annular disk). The baffle flange 1210 extends radially inward from the baffle wall 1202 toward a center axis of the outer conduit 218. The baffle flange 1210 may extend from an edge of the baffle wall 1202 or at a location between the edges of the baffle wall 1202 (e.g., the baffle wall 1202 may extend upstream and/or downstream of the baffle flange 1210). The baffle wall 1202 may define an outer baffle radius of curvature 1211. The outer baffle radius of curvature 1211 may be between 55 mm and 65 mm (e.g., approximately 61 mm, etc.). The baffle flange 1210 may define an inner baffle radius of curvature 1212. The inner baffle radius of curvature 1212 may be between 30 mm and 45 mm (e.g., approximately 38 mm, etc.).

The baffle 1200 may be disposed in the outer conduit 218. The baffle 1200 may be disposed downstream of the mixer 900. For example, a beginning of the baffle wall 1202 may be disposed a distance away from the mixer outlet 912, shown as baffle distance 1214. The baffle distance 1214 may be between 75 mm and 90 mm (e.g., approximately 86.5 mm, etc.). The baffle distance 1214 may be based on the outer baffle radius of curvature 1211. For example, the baffle distance 1214 may be between 200-205% of the outer baffle radius of curvature 1211. As such, the baffle 1200 may be configured such that the baffle distance 1214 is a function of the outer baffle radius of curvature 1211. As mentioned above, the baffle 1200 is disposed downstream of the mixer 900 to make the flow distribution more uniform by disrupting momentum and trajectory of some of the particles. However, no part of the baffle 1200 (e.g., the baffle flange 1210) is aligned with the hub 908. Therefore, the exhaust that flows through the hub 908 may avoid the baffle 1200, which may reduce the backpressure in the decomposition chamber 108.

Figure 14:
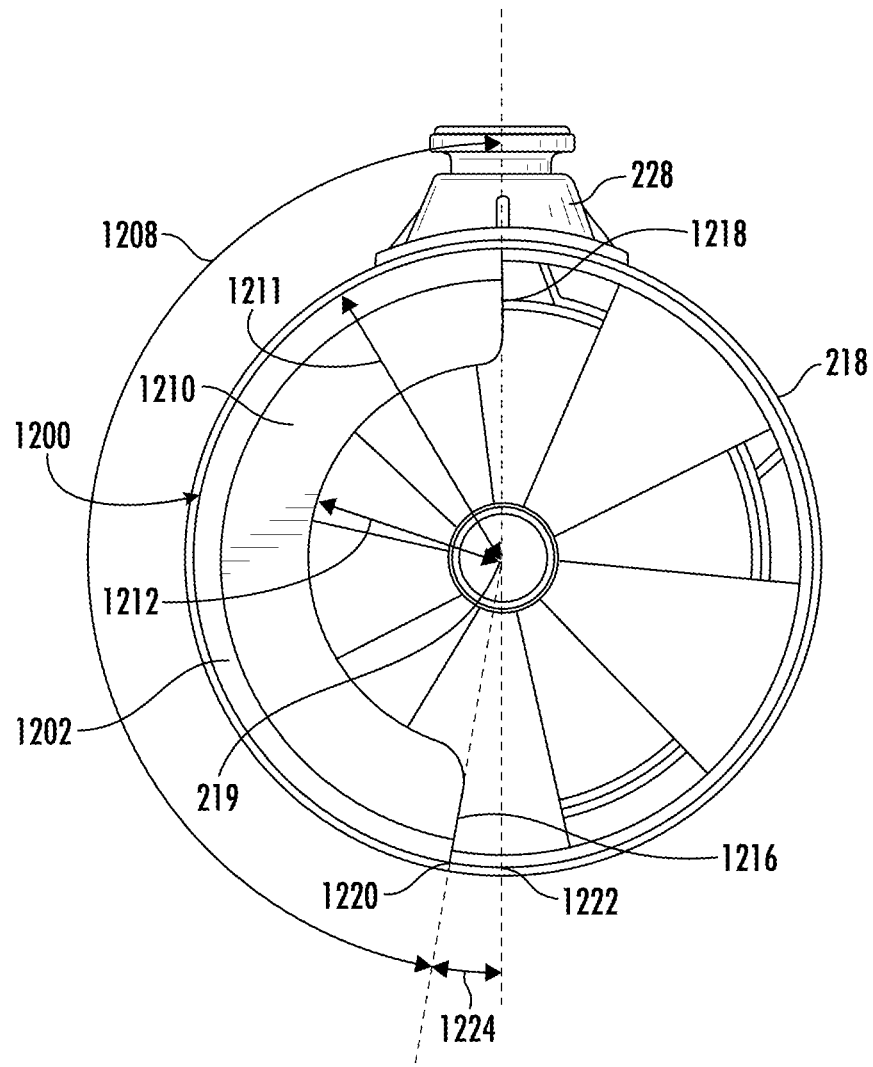
FIG. 14 is a rear view of the portion of the decomposition chamber shown in FIG. 13.

The orientation of the baffle 1200 within the outer conduit 218 may be based on a location of the doser mount 228. For example, the baffle 1200 has a first baffle end 1216 and a second baffle end 1218. The baffle wall 1202 and the baffle flange 1210 may extend between the first baffle end 1216 and the second baffle end 1218. A position for the first baffle end 1216, shown as baffle position 1220, may be based on the location of the doser mount 228. For example, a center of the doser mount 228 may define a baffle reference location 1222. The baffle reference location 1222 may be a location on the internal surface 226 of the outer conduit 218 across from the center of the doser mount 228. The baffle position 1220 may be defined as a baffle offset angle 1224 from the baffle reference location 1222. For example, the baffle offset angle 1224 may be between 5 degrees and 15 degrees (e.g., approximately 10 degrees, etc.) from the baffle reference location 1222. For example, as shown in FIG. 14, the baffle position 1220 may include the first baffle end 1216 being disposed approximately 10 degrees clockwise from the baffle reference location 1222 (e.g., when looking from the downstream outer conduit end 222 toward the upstream outer conduit end 220).

Figure 13:
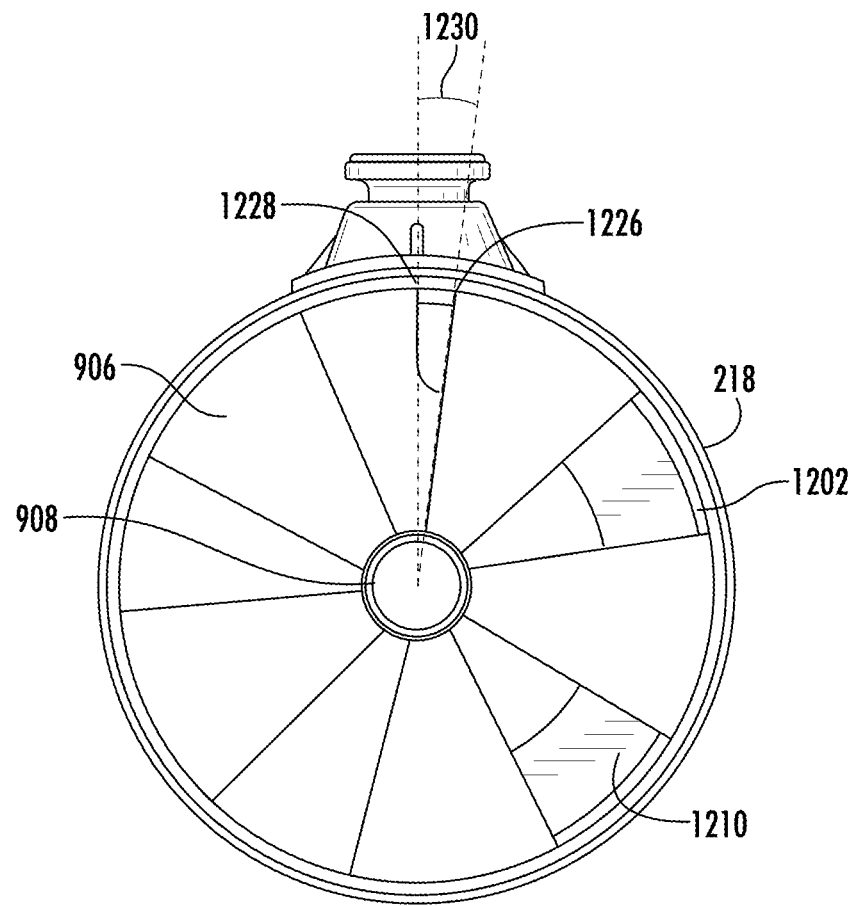
FIG. 13 is a front view of another portion of the decomposition chamber shown in FIG. 2.

The orientation of the vanes 906 of the mixer 900 may also be based on the location of the doser mount 228. For example, a position of a vane 906, shown as vane position 1226, may be based on the location of the doser mount 228. For example, a center of the doser mount 228 may define a vane reference location 1228. The vane reference location 1228 may be a location on the internal surface 226 of the outer conduit 218 adjacent to the center of the doser mount 228. The vane position 1226 may be defined as a vane offset angle 1230 from the vane reference location 1228. For example, the vane offset angle 1230 may be between 5 degrees and 15 degrees (e.g., approximately 10 degrees, etc.) from the vane reference location 1228. For example, as shown in FIG. 13, the vane position 1226 may include a vane edge (e.g., upstream vane edge 918 or downstream vane edge 919) being disposed approximately 10 degrees clockwise from the vane reference location 1228 (e.g., when looking from the upstream outer conduit end 220 toward the downstream outer conduit end 222).

Figure 15:
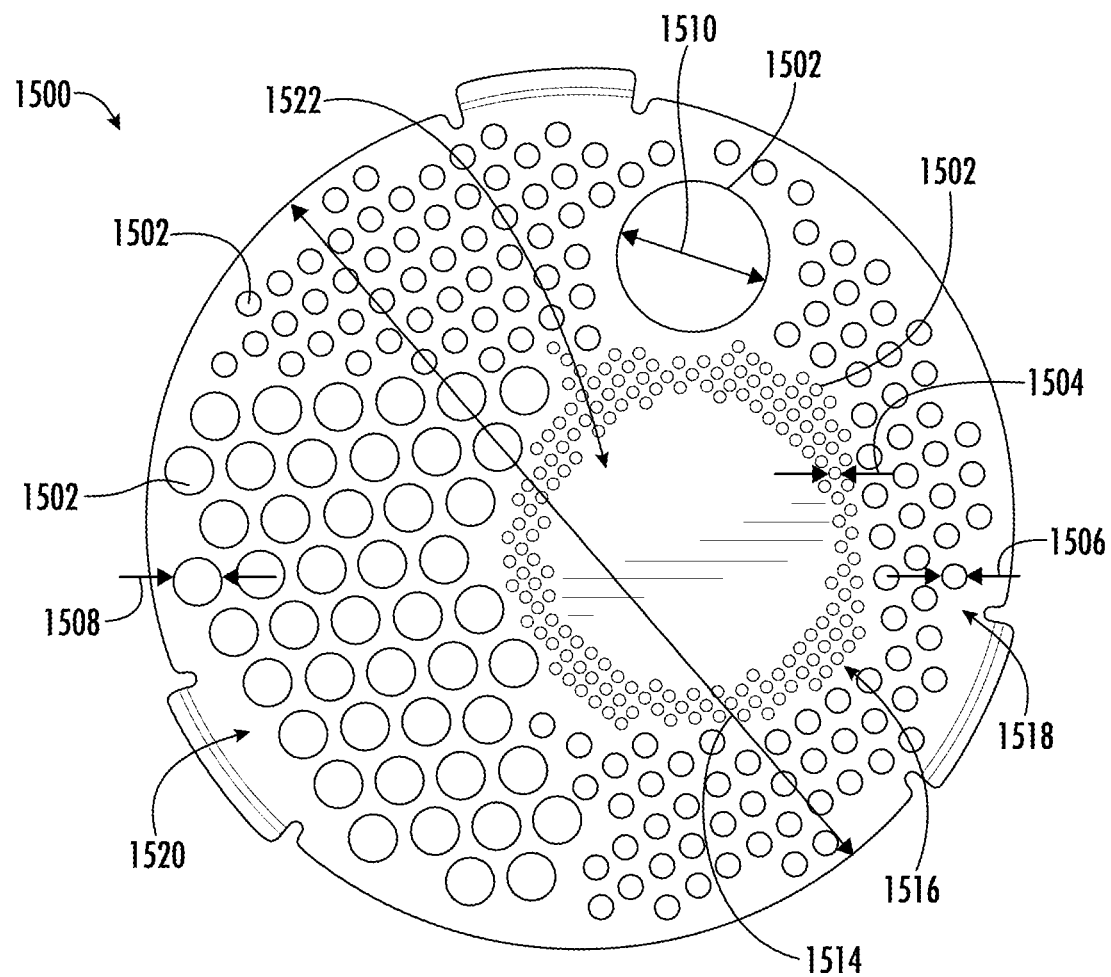
FIG. 15 is a front view of another portion of the decomposition chamber shown in FIG. 2.

The decomposition chamber 108 may also include a plate 1500. FIGS. 2-4, 15-16, and 23-24 illustrate the plate 1500 according to several example embodiments. The plate 1500 is configured to create a uniform flow of the exhaust and reductant mixture. This uniform flow may facilitate desirable operation of the catalyst member 110. As shown in FIG. 15, the plate 1500 may have a plurality of perforations 1502. The plate 1500 may have a perforations of various sizes. For example, the perforations may have four different sizes. At least one of the perforations may have a first diameter 1504, at least one may have a second diameter 1506, at least one may have a third diameter 1508, and at least one may have a fourth diameter 1510. The first diameter 1504 may be between 3 mm-4 mm (e.g., approximately 3.18 mm, etc.). The second diameter 1506 may be between 6 mm and 7 mm (e.g., approximately 6.35 mm, etc.). The third diameter 1508 may be between 10 mm and 15 mm (e.g., approximately 12 mm, etc.). The fourth diameter 1510 may be between 35 mm and 45 mm (e.g., approximately 40 mm, etc.). The plurality of perforations 1502 may be distributed asymmetrically across the plate 1500. For example, instead of being uniformly spaced about the plate 1500, the perforations 1502 can be in clusters of different sizes that are not uniformly spaced about the plate 1500. The plate 1500 can have or define an asymmetrical array of perforations 1502. The asymmetry of the perforations 1502 can facilitate different amounts of fluid to flow through the plate 1500 at different locations.

The plurality of perforations 1502 may include at least one set of perforations 1502. A set of perforations 1502 may be or include a grouping of perforations 1502 of the same or similar sizes. The plurality of perforations 1502 can have any number, type, or configuration of sets of perforations 1502. For example, the plurality of perforations 1502 may include a first set of perforations 1516. The first set of perforations 1516 may be arranged in a ring configuration. For example, the first set of perforation 1516 may include a plurality of perforations 1502 with the first diameter 1504. The first set of perforations 1516 may be arranged to form a ring, as shown in FIG. 15. The ring may be offset from a center of the plate 1500. The ring may be surrounded by a plurality of other perforations 1502. For example, the plurality of perforations 1502 may include a second set of perforations 1518. The second set of perforations 1518 may include a plurality of perforations 1502 with the second diameter 1506. The second set of perforations 1518 may extend at least partially around the first set of perforations 1516. The second set of perforations 1518 may be separated into a first subset and a second subset. For example, at least one perforation 1502 that is not a part of the second set of perforations 1518 may be disposed within the second set of perforations 1518 to define the first subset and the second subset. For example, at least one perforation 1502 with the fourth diameter 1510 may be disposed within the second set of perforations 1518 to define the first subset and the second subset of the second set of perforations 1518. The perforation 1502 with the fourth diameter 1510 may be disposed adjacent to the ring of the first set of perforations 1516.

The plurality of perforations 1502 may include a third set of perforations 1520. The third set of perforations 1520 may include a plurality of perforations 1502 with the third diameter 1508. The third set of perforations 1520 may extend at least partially around the ring of the first set of perforations 1516. The second set of perforations 1518, the third set of perforations 1520, and the at least one perforation 1502 with the fourth diameter 1510 can surround the ring of the first set of perforations 1516 (e.g., extend around a perimeter of the ring).

Figure 23:
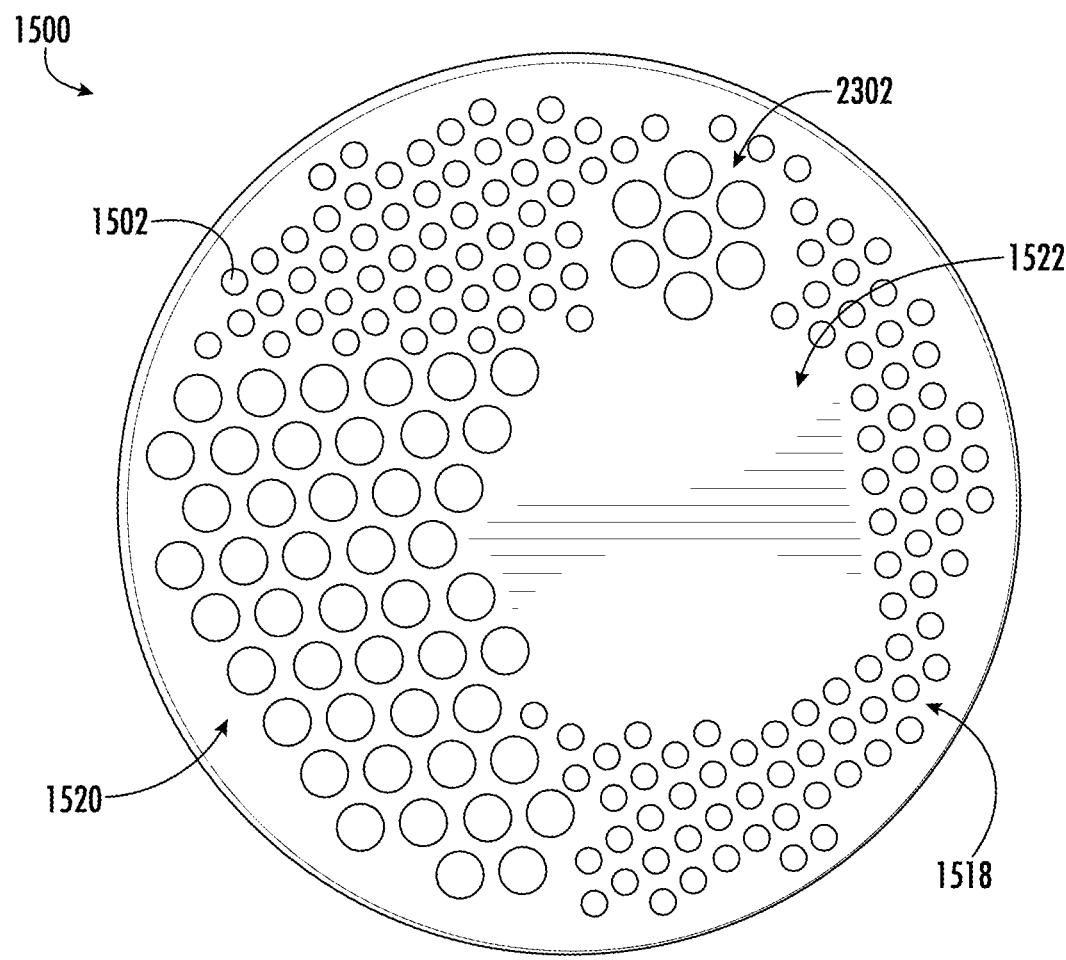
FIG. 23 is a front view of another portion of the decomposition chamber shown in FIG. 2.

In some embodiments, as shown in FIG. 23, the plate 1500 may have a fourth set of perforations 2302. For example, the fourth set of perforations 2302 may replace the at least one perforation 1502 with the fourth diameter 1510. The fourth set of perforations 2302 may be disposed within the second set of perforations 1518 to define the first subset and the second subset of the second set of perforations 1518. The fourth set of perforations 2302 may include a plurality of perforations 1502 with the third diameter 1508.

In some embodiments, the plate 1500 may not have the first set of perforations 1516. For example, as shown in FIG. 23, the second set of perforations 1518, the third set of perforations 1520, and the fourth set of perforations 2302 can be configured to form a ring, without the first set of perforations 1516 being disposed in the ring.

Figure 24:
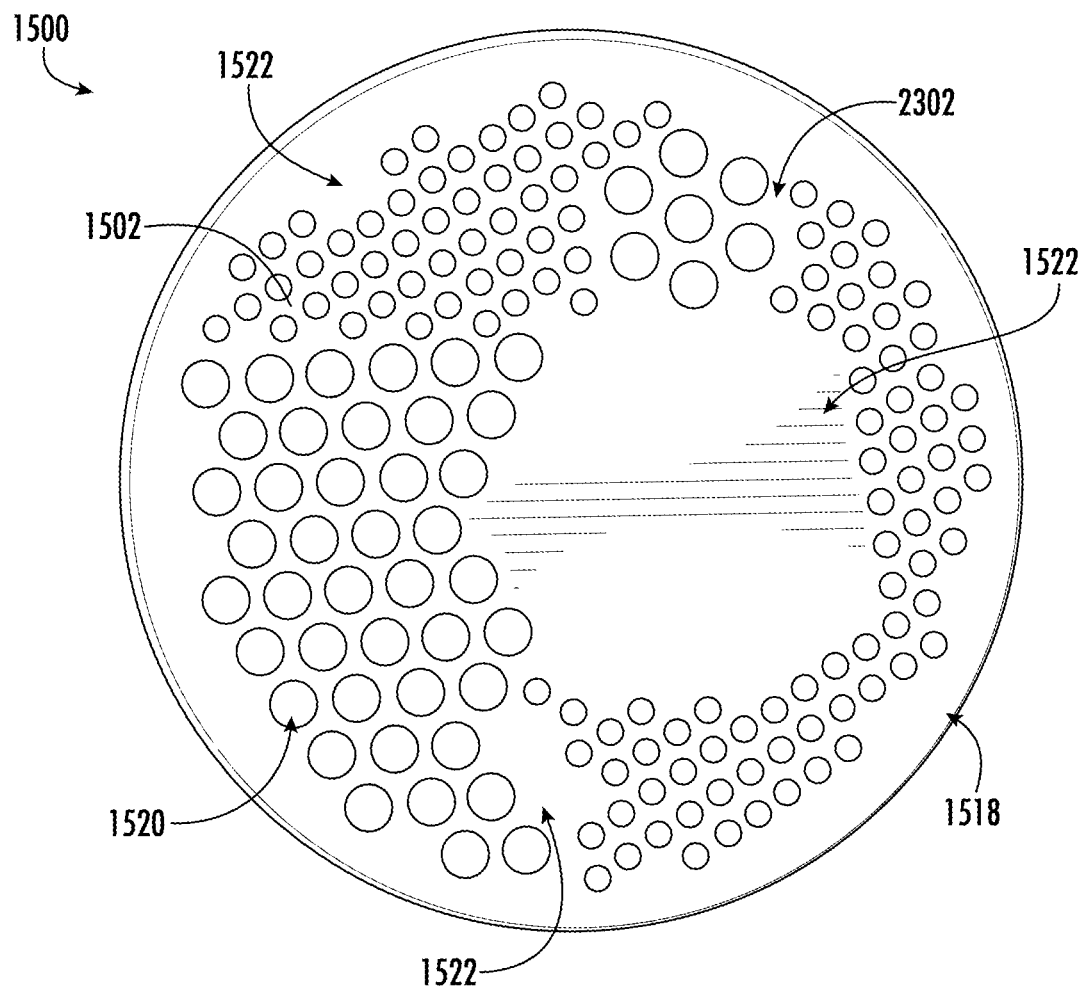
FIG. 24 is a front view of another portion of the decomposition chamber shown in FIG. 2.

In some embodiments, the perforations 1502 can be arranged on the plate 1500 to cover a majority of the surface area of the plate 1500. For example, a first set of perforations 1502 can be adjacent to a second set of perforations 1502. In some embodiments, the plate 1500 may include at least one blocked zone 1522. The blocked zone 1522 can be an area of the plate 1500 that includes no perforations 1502 or wherein the perforations are otherwise blocked or filled. The blocked zone 1522 can be positioned on the plate 1500 to facilitate proper flow and mixing of the fluid that flows through the decomposition chamber 108. For example, the plate 1500 may include a blocked zone 1522 inside the ring defined by the first set of perforations 1516 or the ring defined by the second, third, and fourth sets of perforations 1518, 1520, 2302. Blocked zones 1522 can be disposed at any location of the plate 1500. For example, as shown in FIG. 24, a blocked zone 1522 may be disposed between the second set of perforations 1518 and the third set of perforations 1520. For example, at least one perforation 1502 of the second set or the third set of perforations 1518, 1520 may be removed or covered such that fluid cannot flow through that portion of the plate 1500. In some embodiments, a blocked zone 1522 may be disposed adjacent to an outer peripheral edge of the plate 1500. For example, as shown in FIG. 24, a blocked zone 1522 may be disposed in the second set of perforations 1518 adjacent to the edge of the plate 1500. At least one perforation 1502 of the second set of perforations 1518 to prevent fluid from flowing through that portion of the plate 1500.

Figure 16:
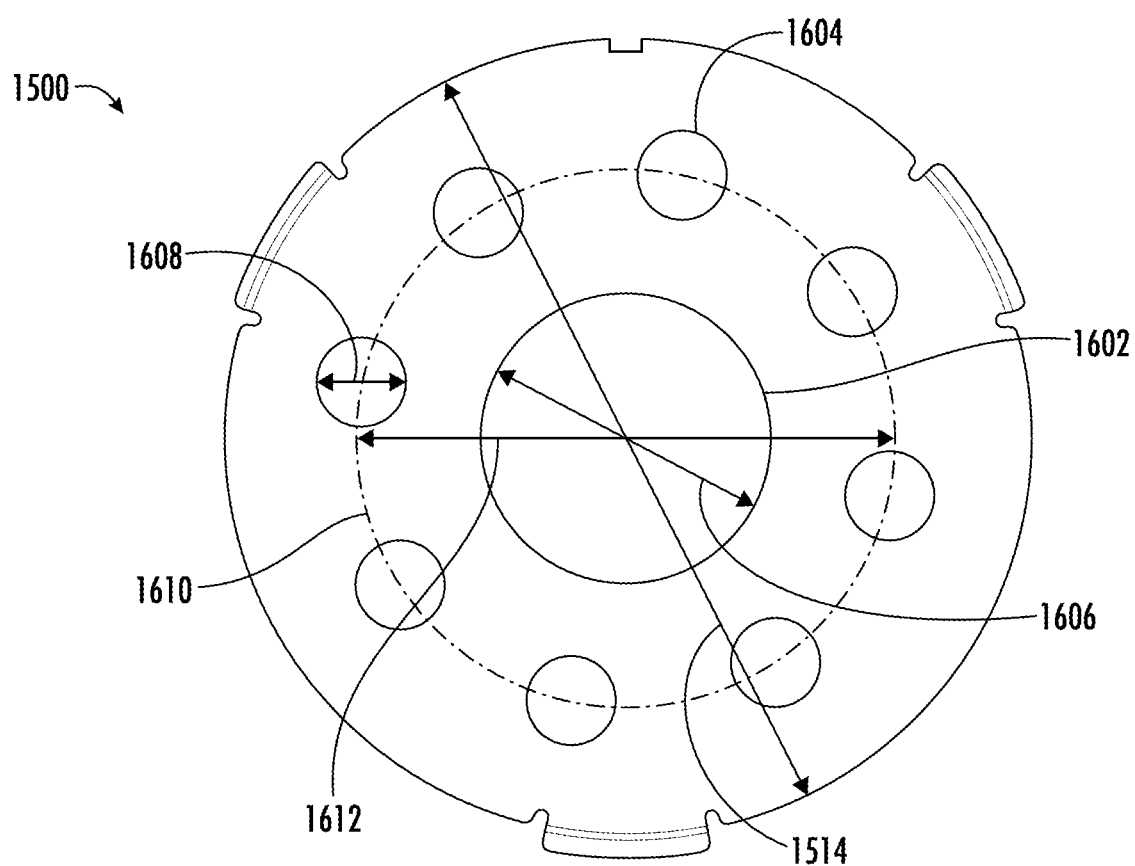
FIG. 16 is a front view of another portion of the decomposition chamber shown in FIG. 2.
Figure 17:
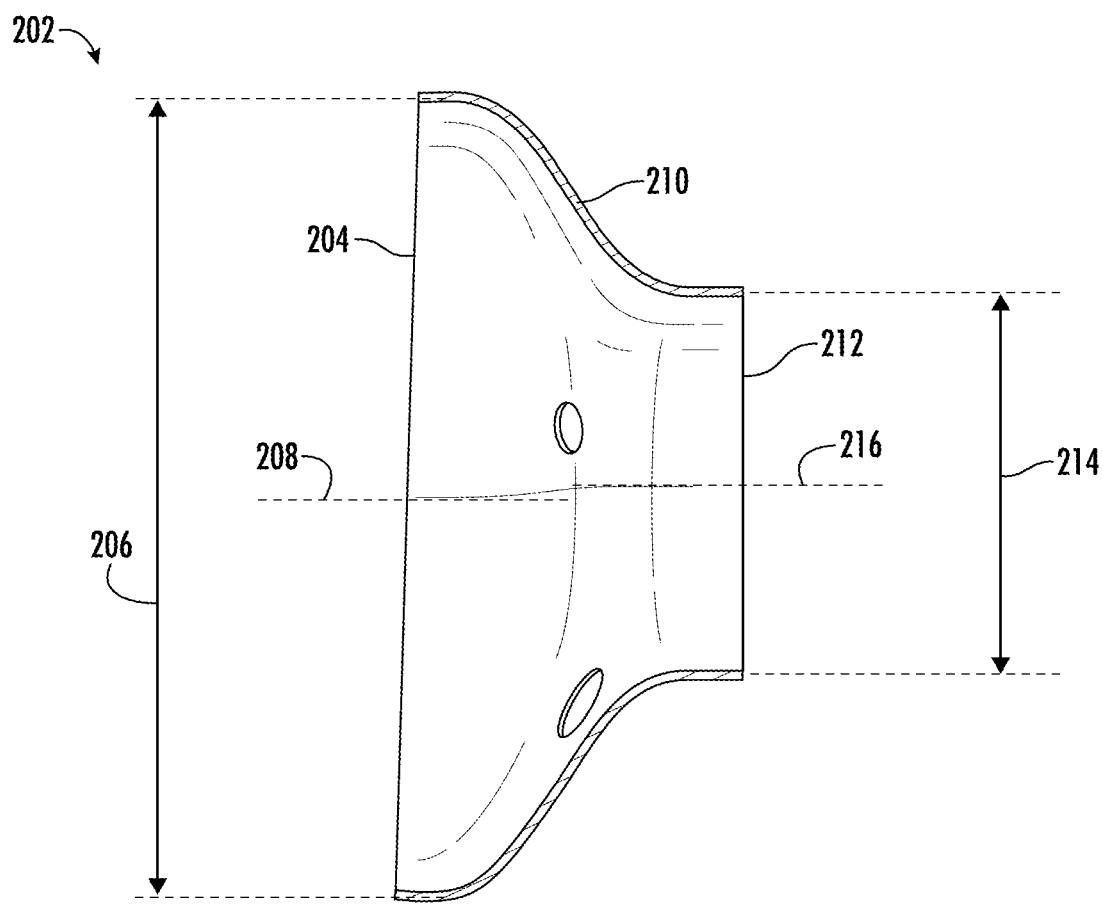
FIG. 17 is a side view of another portion of the decomposition chamber shown in FIG. 2.
Figure 18:
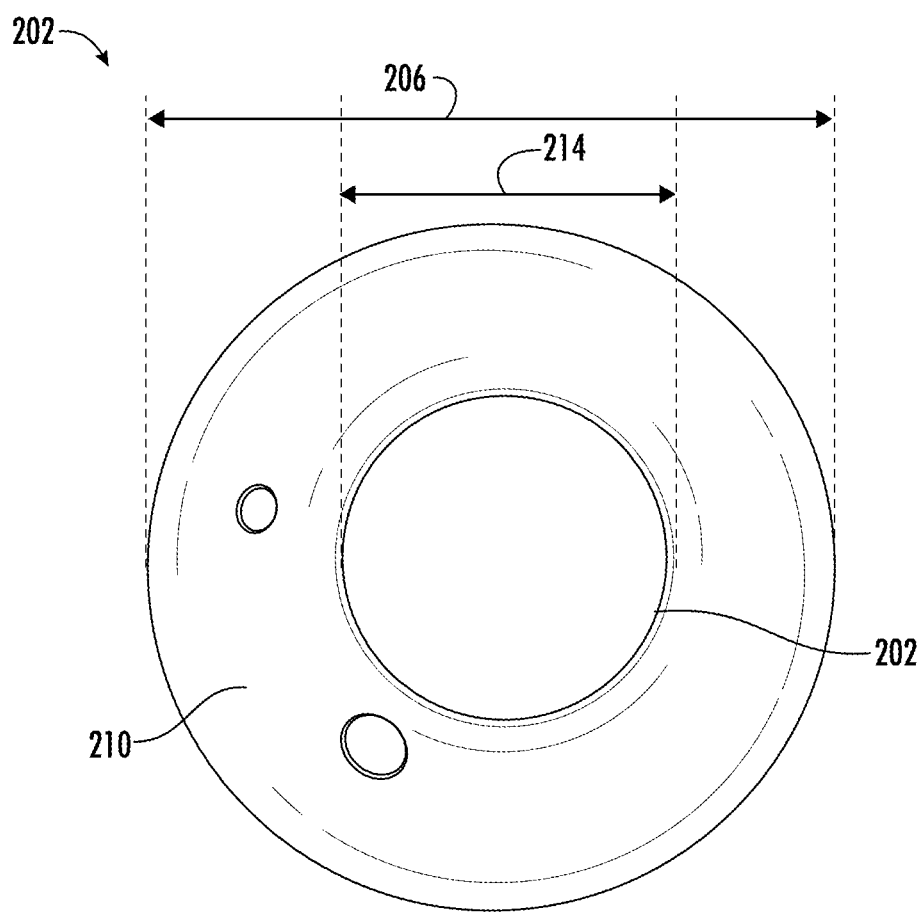
FIG. 18 is a back view of the portion of the decomposition chamber shown in FIG. 17.
Figure 19:
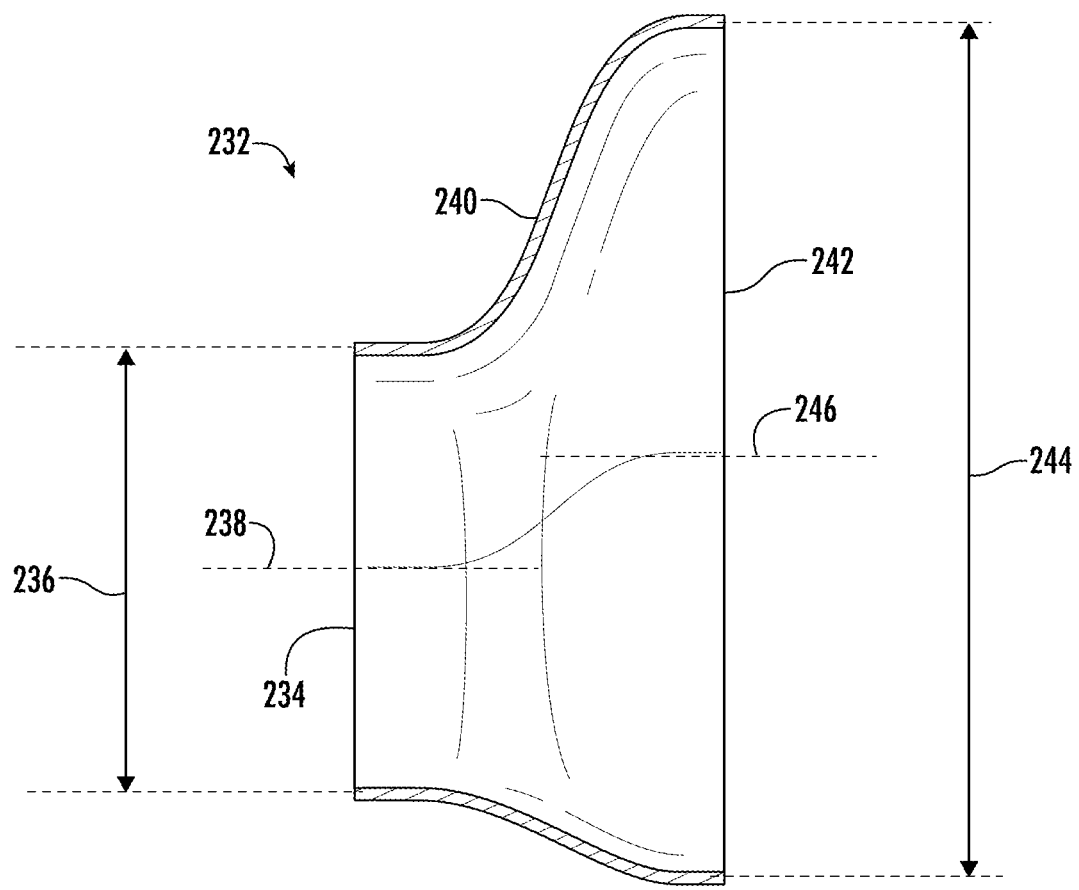
FIG. 19 is a side view of another portion of the decomposition chamber shown in FIG. 2.
Figure 20:
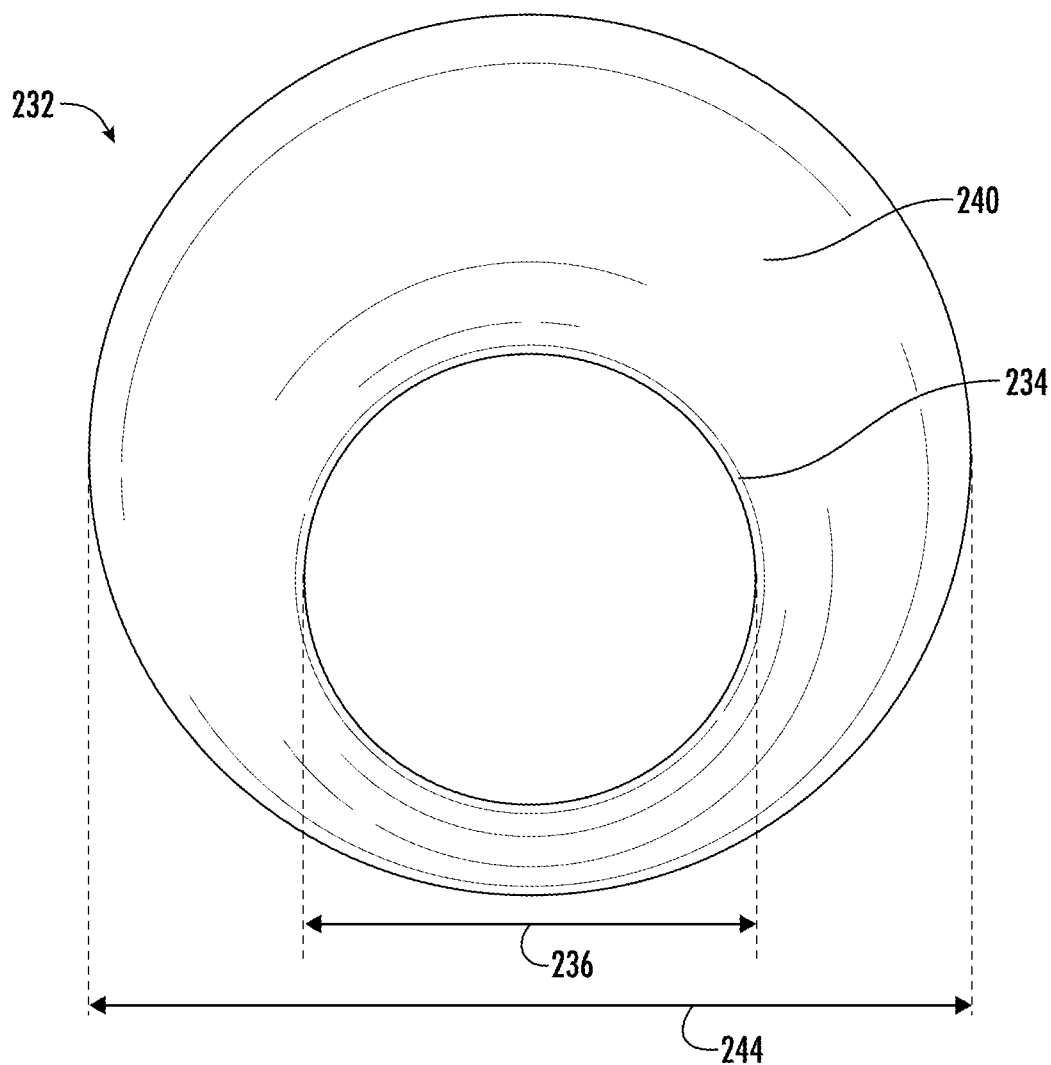
FIG. 20 is a front view of the portion of the decomposition chamber shown in FIG. 19.
Figure 21:
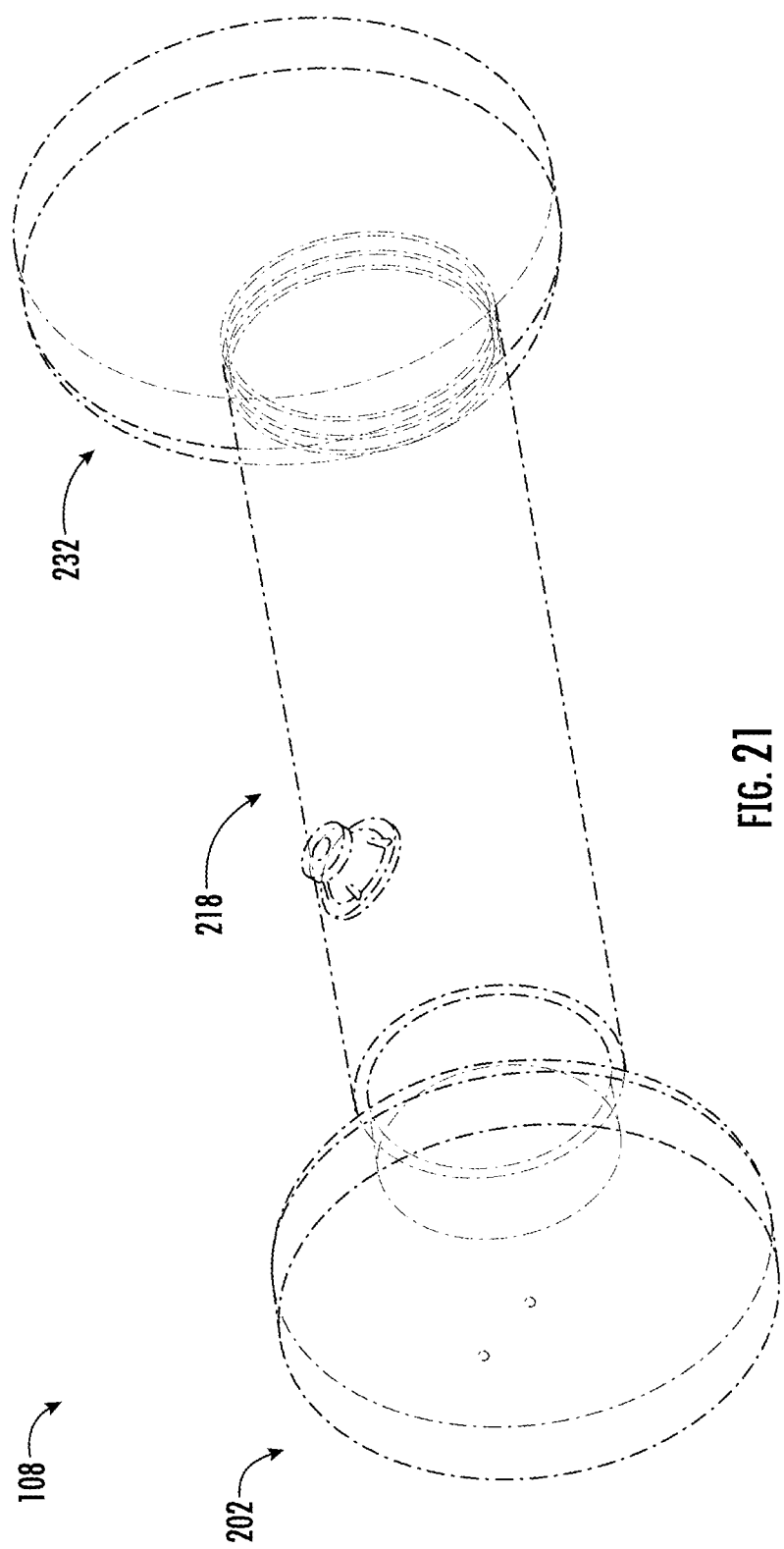
FIG. 21 is a partially-transparent perspective view of a portion of the decomposition chamber shown in FIG. 2.

In some embodiments, the plate 1500 may be an annular plate, as shown in FIG. 16. The annular plate 1500 may include a central perforation 1602. The central perforation 1602 may be disposed at a center of the plate 1500 and have a first diameter 1606. The first diameter 1606 may be between 70 mm and 90 mm (e.g., approximately 80 mm, etc.). The annular plate 1500 may include at least one radial perforation 1604. The radial perforations 1604 may be disposed radially outward from the central perforation 1602. The radial perforations 1604 may have a second diameter 1608. The second diameter 1608 may be between 20 mm and 30 mm (e.g., approximately 25 mm, etc.). The radial perforations 1604 may be disposed in a circular arrangement to form a circle 1610 with a third diameter 1612. The third diameter 1612 may be between 140 mm and 160 mm (e.g., approximately 150 mm, etc.). The circle 1610 to pass through the centers of the radial perforations 1604. In some embodiments, the plate 1500 may include the central perforation 1602 without the radial perforations 1604. In some embodiments, the plate 1500 may include the radial perforations 1604 without the central perforation 1602.

The plate 1500 is disposed in the outlet fitting 232. The plate 1500 is disposed downstream of the mixer 900 and the baffle 1200. The plate 1500 may be disposed a distance downstream of the mixer 900, shown as plate distance 1512. The plate distance 1512 may be measure from the mixer inlet 910 to the plate 1500. The plate distance 1512 may be between 180 mm and 200 mm (e.g., approximately 190 mm, etc.). The plate 1500 may have a plate diameter 1514. The plate diameter 1514 may be between 220 mm and 230 mm (e.g., approximately 223.8 mm, etc.). At least a portion of the perimeter of the plate 1500 may interface with the outlet fitting 232. The plate 1500 may couple to the outlet fitting.

An orientation of the plate 1500 may be a function of the baffle 1200. For example, a plate 1500 may have asymmetric perforations 1502 with a first set of perforations 1502 having a larger diameter and a second set of perforations 1502 having a smaller diameter. In some embodiments, at least a portion of the second set of perforations 1502 may be aligned with the baffle 1200. In some embodiments, more perforations 1502 from the second set are aligned with the baffle 1200 than perforations 1502 from the first set.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A decomposition chamber for an aftertreatment system, the decomposition chamber comprising:
   an outer conduit having an inner surface;
   a doser mount coupled to the outer conduit;
   an inner conduit disposed within the outer conduit, the inner conduit comprising:
      an upstream end,
      a downstream end,
      an outer surface that is spaced from the inner surface of the outer conduit,
      an opening aligned with the doser mount in a direction perpendicular to an axial direction of the inner conduit, the opening disposed closer to the upstream end than to the downstream end, and
      a lip extending along a portion of the opening, the lip angled partially outward and partially toward the upstream end.

2. The decomposition chamber of claim 1, wherein:
   the opening comprises:
      a first edge defined by a first radius of curvature, and a second edge positioned downstream of the first edge and having a second radius of curvature, the second radius of curvature being greater than the first radius of curvature; and the lip extends along at least a portion of the second edge.

3. The decomposition chamber of claim 2, wherein:
the first edge extends around a first half of the opening, and
the second edge extends around a second half of the opening.

4. The decomposition chamber of claim 1, further comprising:
a mixer disposed within the outer conduit and downstream of the inner conduit, the mixer comprising:
a hub, and
a plurality of vanes, each of the plurality of vanes coupled to the hub.

5. The decomposition chamber of claim 4, further comprising:
a baffle disposed within the outer conduit and downstream of the mixer, the baffle comprising:
a first portion having a shape of a portion of a cylinder, and
a second portion having a shape of a portion of an annular object, the second portion extending radially inward from the first portion.

6. The decomposition chamber of claim 5, wherein the baffle comprises a baffle angle coverage that ranges between 160 degrees and 180 degrees.

7. The decomposition chamber of claim 5, further comprising:
an outlet fitting coupled to a downstream end of the outer conduit, the outlet fitting having an upstream opening with a first area, and a downstream opening with a second area larger than the first area, the upstream opening having a first central axis, the downstream opening having a second central axis that is offset from the first central axis; and
a plate disposed in the outlet fitting, the plate having an asymmetrical array of perforations.

8. The decomposition chamber of claim 1, further comprising:
a spacer disposed around the inner conduit, the spacer comprising:
a body interfacing with the outer surface; and
a plurality of flanges, each of the plurality of flanges extending away from the inner conduit and interfacing with the inner surface;
wherein the spacer positions the inner conduit within the outer conduit such that the outer surface is spaced apart from the inner surface.

9. The decomposition chamber of claim 8, wherein:
each of the flanges has a flange length;
the outer surface is disposed away from the inner surface a distance that corresponds to the flange length; and
the lip has a lip height that is less than the flange length.

10. The decomposition chamber of claim 1, further comprising:
a first spacer disposed proximate the upstream end, the first spacer comprising:
a first body interfacing with the outer surface, and
a first flange extending away from the inner conduit and interfacing with the inner surface; and
a second spacer disposed proximate the downstream end, the second spacer comprising:
a second body interfacing with the outer surface, and
a second flange extending away from the inner conduit and interfacing with the inner surface;
wherein the first spacer is rotated relative to the second spacer such that the first flange is offset from the second flange.

11. The decomposition chamber of claim 10, wherein:
the first spacer is disposed a first distance from the upstream end; and
the second spacer is disposed a second distance from the downstream end, the first distance being less than the second distance.

12. The decomposition chamber of claim 1, further comprising:
a first spacer extending around the inner conduit and disposed proximate the upstream end;
a second spacer extending around the inner conduit and disposed proximate the downstream end;
a mixer disposed in the outer conduit and downstream of the inner conduit;
a baffle disposed in the outer conduit and downstream of the mixer;
an outlet fitting coupled to the outer conduit; and
a plate disposed in the outlet fitting.

13. The decomposition chamber of claim 12, wherein:
the mixer is disposed a first distance downstream of the downstream end; and
the baffle is disposed a second distance downstream of the mixer, the second distance being greater than the first distance.

14. The decomposition chamber of claim 12, further comprising an inlet fitting coupled to the outer conduit, the inlet fitting comprising an upstream inlet opening centered on an upstream inlet axis;
wherein the outlet fitting comprises a downstream outlet opening centered on a downstream outlet axis; and
wherein the upstream inlet axis is offset from the downstream outlet axis.

15. An aftertreatment system, comprising:
a reductant delivery system, comprising:
a reductant source; and
a dosing module fluidly coupled to the reductant source; and
a decomposition chamber, comprising:
an outer conduit having an inner surface;
a doser mount extending from the outer conduit, wherein the dosing module is coupled to the outer conduit via the doser mount; and
an inner conduit disposed within the outer conduit, the inner conduit comprising an opening aligned with the doser mount in a direction perpendicular to an axial direction of the inner conduit;
a mixer disposed within the outer conduit and downstream of the inner conduit; and
a baffle disposed within the outer conduit and downstream of the mixer.

16. The aftertreatment system of claim 15, wherein the inner conduit further comprises:
an upstream end; and
a lip extending along a portion of the opening and angled partially outward and partially toward the upstream end.

17. The aftertreatment system of claim 16, wherein:
the opening comprises:
a first edge defined by a first radius of curvature, and a second edge positioned downstream of the first edge and having a second radius of curvature, the second radius of curvature being greater than the first radius of curvature; and the lip extends along at least a portion of the second edge.

18. The aftertreatment system of claim 16, wherein the baffle comprises:
   a first portion having a shape of a portion of a cylinder; and
   a second portion having a shape of a portion of an annular object, wherein the second portion extends radially inward from the first portion.

19. The aftertreatment system of claim 18, wherein the decomposition chamber further comprises:
   an outlet fitting coupled to a downstream end of the outer conduit, the outlet fitting having an upstream opening with a first area, and a downstream opening with a second area larger than the first area, the upstream opening having a first central axis, the downstream opening having a second central axis that is offset from the first central axis; and
   a plate disposed in the outlet fitting, the plate having an asymmetrical array of perforations.

20. The aftertreatment system of claim 19, wherein the decomposition chamber further comprises:
   a spacer disposed around the inner conduit, the spacer comprising:
      a body interfacing with an outer surface of the inner conduit; and
      a plurality of flanges, each of the plurality of flanges extending away from the inner conduit and interfacing with the inner surface of the outer conduit;
   wherein the spacer positions the inner conduit within the outer conduit such that the outer surface is spaced apart from the inner surface.

* * * * *